US011220282B2

(12) United States Patent
Chaudeurge

(10) Patent No.: US 11,220,282 B2
(45) Date of Patent: Jan. 11, 2022

(54) STROLLER ACCESSORY AND DOUBLE STROLLER ASSEMBLY

(71) Applicant: BABYZEN, Aix-en-Provence (FR)

(72) Inventor: Jean-Michel Chaudeurge, Tourves (FR)

(73) Assignee: BABYZEN, Aix-en-Provence (FR)

( * ) Notice: Subject to any disclaimer, the term of this patent is extended or adjusted under 35 U.S.C. 154(b) by 204 days.

(21) Appl. No.: 16/739,798

(22) Filed: Jan. 10, 2020

(65) Prior Publication Data

US 2020/0223469 A1 Jul. 16, 2020

(30) Foreign Application Priority Data

Jan. 14, 2019 (FR) .......................................... 1900316
Jun. 9, 2019 (FR) .......................................... 1909819

(51) Int. Cl.
*B62B 7/00* (2006.01)
*B62B 9/08* (2006.01)
*B62B 7/04* (2006.01)

(52) U.S. Cl.
CPC .............. *B62B 7/008* (2013.01); *B62B 7/042* (2013.01); *B62B 9/082* (2013.01)

(58) Field of Classification Search
CPC ........... B62B 7/008; B62B 7/042; B62B 7/14; B62B 7/06; B62B 7/142; B62B 9/082;
(Continued)

(56) References Cited

U.S. PATENT DOCUMENTS

| 4,805,938 A * | 2/1989 | Redmond ............... F16B 2/065 |
| | | 280/47.35 |
| 5,653,460 A * | 8/1997 | Fogarty ..................... B62B 9/28 |
| | | 280/642 |
| 5,848,797 A * | 12/1998 | Paez ....................... B62B 3/144 |
| | | 280/33.993 |

(Continued)

FOREIGN PATENT DOCUMENTS

| EP | 2 684 764 A2 | 1/2014 |
| EP | 2 684 764 A3 | 3/2017 |

(Continued)

OTHER PUBLICATIONS

FR Search Report issued in FR Patent Application No. 1900316 dated Aug. 7, 2019.

*Primary Examiner* — Steve Clemmons
(74) *Attorney, Agent, or Firm* — Nixon & Vanderhye

(57) ABSTRACT

A stroller accessory connects to a stroller to form a double stroller together and is unusable to transport a child when the accessory is disconnected from the stroller. It includes a frame, a connection mechanism reversibly connecting the accessory to the stroller while defining a tilting axis around which the front part of the accessory frame and the rear of the stroller frame tilt freely relative to one another, two pivoting wheels on a rear part of the frame, a pushing member on the frame rear, a control mechanism controlling a rolling blocking of the double stroller, on the frame front that cooperates mechanically with a rolling blocking system, in the stroller, controlling the blocking system, and an actuating member, on the frame rear to be activated by a user standing behind the double stroller, and which is coupled to the control mechanism so as to actuate the latter.

18 Claims, 18 Drawing Sheets

(58) Field of Classification Search
CPC ........... B62B 9/087; B62B 9/12; B62B 9/085; B62B 9/08; B62B 5/0485; B62B 2207/02
See application file for complete search history.

(56) References Cited

U.S. PATENT DOCUMENTS

| | | | |
|---|---|---|---|
| 6,540,239 B2 * | 4/2003 | Lee, Jr. ................... | B62B 3/008 |
| | | | 280/33.993 |
| 6,938,906 B1 | 9/2005 | Black | |
| 6,981,709 B2 * | 1/2006 | Saint ........................ | B62B 7/04 |
| | | | 280/43 |
| 7,597,332 B2 * | 10/2009 | Thompson ................ | B62B 7/00 |
| | | | 280/33.991 |
| 9,056,622 B2 * | 6/2015 | Thomas .................... | B62B 7/04 |
| 9,283,978 B2 * | 3/2016 | Kikui ....................... | B62B 7/042 |
| 9,771,095 B2 * | 9/2017 | Laffan ...................... | B62B 9/28 |
| 2007/0001410 A1 | 1/2007 | Thompson | |
| 2010/0072731 A1 | 3/2010 | Thompson | |

FOREIGN PATENT DOCUMENTS

| | | | | |
|---|---|---|---|---|
| EP | 3626579 A1 * | 3/2020 | ............... | B62B 9/12 |
| ES | 2 253 093 A1 | 5/2006 | | |
| GB | 2497620 A * | 6/2013 | ............... | B62B 9/28 |
| WO | WO 2007/033562 | 3/2007 | | |
| WO | 2010/000987 A1 | 1/2010 | | |
| WO | 2011/148062 A1 | 12/2011 | | |
| WO | WO 2018/050303 | 3/2018 | | |

* cited by examiner

STROLLER ACCESSORY AND DOUBLE STROLLER ASSEMBLY

The present invention relates to a stroller accessory. The invention also relates to an assembly forming a double stroller, including a stroller and such a stroller accessory.

Whether it involves handling a birth of twins or the birth of children who are close together in age, the joint transport of two very young children in a stroller by a single parent constitutes an issue for which up to now the only solutions provided, described in detail below, have all been based on an idea of providing a double stroller by "enlarging" a single stroller, that is to say, a stroller with a single permanent seat, the frame of which conventionally rests on two fixed rear wheels or two pivoting front wheels and the driving of which is done by a user standing up behind the frame in order to urge the movement of the latter to advance and in order to command the blocking of the rolling of the rear wheels in order to immobilize the single stroller. These existing double stroller solutions are not very satisfactory, in particular not being practical, or comfortable, and even being dangerous.

Indeed, a first solution consists of double strollers in which both children to be transported are installed side by side. This approach necessarily involves a substantial widening of the double stroller, even limiting its minimum individual width of the installation area of each of the two children, which is also very detrimental to their comfort and complicates, or even prohibits installing infant seats or infant cradles. In service, the use of such a double stroller is impossible in a narrow passage, in particular a sidewalk with a small width. Additionally, since the space between the left and right wheels of the double stroller is very large and the weight of this double stroller is substantial, the latter is difficult to handle, despite the use of a rear handle that runs continuously over the entire width of the double stroller. Furthermore, the folding and unfolding manipulations are so tedious that the user generally gives up on them, which means that the double stroller stays bulky even when it is not in use.

A second solution consists of double strollers in which the two children to be transported are in tandem, that is to say, one behind the other, sometimes face-to-face, and at the same height. In this case, the respective installation areas of the two children can be made to be wide and are independent of one another, which is comfortable for the children and allows the installation of any type of seat and cradle receiving each of the two children. However, this approach necessarily causes the frame of the double stroller to be very long: this requires substantially reinforcing the structural strength of the frame, in particular by adding reinforcing bars extending in the front-back direction of the frame, which makes the frame much heavier, and once again complicates the folding and unfolding manipulations. In use, the wheelbase between the front wheels and the rear wheels of the double stroller is so large that the maneuverability of this double stroller is mediocre, even when using an artifice consisting of replacing the traditional handlebar with handles in wheel form. Additionally, this type of double stroller can only cross a sidewalk at the cost of tedious, if not dangerous operations: indeed, in light of the large wheelbase of the frame, it is impossible for the user to pick up the front wheels by slightly tilting the back of the double stroller backward around the axis of rotation of the rear wheels pressed against the ground, such that in order to move up onto a sidewalk, the user must generally let go of the handle, then move in front of the double stroller and crouch down to lift the front until the front wheels are resting up on the sidewalk, before returning behind the stroller to once again grasp the handlebar.

A third solution consists of double strollers in which both children to be transported are one behind the other while being semi-superimposed. According to this approach, the frame of the double stroller is provided in order, in addition to supporting a seat or a primary cradle at a conventional first height, to support, generally in the front part of the frame, a seat or a secondary cradle that is fastened, often removably, to the chassis at a second height much lower than the first height. Aside from the fact that the child installed in the seat or the secondary cradle, as well as his parents, generally very moderately appreciate his placement level with the tailpipes of cars, it will be noted that above all, here again, the frame of the double stroller must necessarily be extended and reinforced, therefore made heavier, relative to a single stroller. The same negative impacts are therefore found regarding maneuverability and safety during use, as well as practicality for folding.

Outside the various double stroller solutions listed above, it is known to be able to transport two children using a single stroller when the latter is equipped with an additional board, also referred to as "kiddy board". This board comprises a frame forming a platform, which is provided with wheels and which is provided to be connected reversibly to the rear part of the frame of the single stroller. Once connected, the board rolls on the ground, while being driven by the stroller, which is pushed by an adult user. The assembly, which is formed by the stroller and the board connected to the latter, makes it possible to transport both the first child, installed in the stroller, and a second child, generally older than the first child, standing up on the platform of the frame of the board, while the adult, placed behind the platform, holds out the arms to push the assembly by urging the handlebar or the handles, provided at the rear of the single stroller. Such a board is for example described in detail in WO 2018/050303. In practice, the use of such a board is only possible if the second transported child is old enough to stand correctly by himself on the board. More generally, such a board and the single stroller to which this board is connected do not form a double stroller, which could accommodate two children in tandem under similar respective comfort conditions and which could be driven by an adult user standing up behind the double stroller to push it in order to advance and to control the blocking of the rolling thereof in order to immobilize it.

Lastly, WO 2007/033562 proposes, without great detail, to removably attach an additional stroller body behind a main stroller, in order to form a double stroller. This document provides that the respective frames of the main stroller and of the body of the additional stroller be rigidly secured to one another, which causes at least the same drawbacks as the tandem solution mentioned above.

The aim of the present invention is to propose a new stroller accessory, which, from a single stroller, forms a double stroller that, without denying the comfort of both children to be transported and the configurability of the seats and/or cradles used, is practical, maneuverable and safe.

To that end, the invention relates to a stroller accessory, which is connectable to a stroller so as together to form a double stroller and which is unusable to transport a child when the stroller accessory is disconnected from the stroller, wherein the stroller accessory includes:

a frame that, during use, bears a receiving member in which a child to be transported can be installed, a connection mechanism for reversibly connecting the stroller accessory to the stroller in order to form the double stroller, the connection mechanism being borne by a front part of the frame of the stroller accessory and being suitable for securing the front part of the frame of the stroller accessory removably to a rear part of a frame of the stroller so as both to arrange the stroller accessory behind the stroller in a front-back direction and to define a tilting axis, which extends during use substantially parallel to the ground and substantially perpendicular to the front-back direction and around which the front part of the frame of the stroller accessory and the rear part of the frame of the stroller tilt freely relative to one another, two wheels, which, when the stroller accessory is connected to the stroller by the connection mechanism, bear and roll on the ground and which are coupled to a rear part of the frame of the stroller accessory so as to pivot around respective pivot axes, a pushing member, which is borne by the rear part of the frame of the stroller accessory and which is suitable for being urged manually by a user standing behind the double stroller, a control mechanism for controlling a rolling blocking of the double stroller, the control mechanism being borne by the front part of the frame of the stroller accessory and being suitable, when the stroller accessory is connected to the stroller by the connection mechanism, for cooperating mechanically with a rolling blocking system, integrated into the stroller, so as to control the rolling blocking system, and an actuating member, which is borne by the rear part of the frame of the stroller accessory so as to be able to be activated by a user standing behind the double stroller, and which is coupled to the control mechanism so as to actuate the control mechanism.

The invention also relates to an assembly forming a double stroller, including a stroller and a stroller accessory as defined above, wherein the stroller comprises:

a frame, a rear part of which is connected to the front part of the frame of the stroller accessory by the connection mechanism and which, during use, supports a receiving member in which a child can be installed other than the child who can be installed in the receiving member of the stroller accessory, at least one front wheel that, during use, bears and rolls on the ground and that is coupled to a front part of the frame of the stroller in a pivoting manner, two rear wheels that, during use, bear and roll on the ground and that are coupled to the rear part of the frame of the stroller fixedly, a pushing member that is borne by the rear part of the frame of the stroller, and a rolling blocking system which is at least partly borne by the rear part of the frame of the stroller and which is suitable for interfering reversibly with the rear wheels of the stroller so as to block the rolling thereof.

Thus, the invention breaks with the existing approaches, in that the invention proposes to form a double stroller by associating a single stroller, in particular an existing single stroller, and an accessory that is attached, as additional device, to this single stroller. The stroller and the accessory each have their own frame and these two frames can be connected one behind the other by a reversible connecting mechanism, carried by the accessory and designed to removably secure the two frames while authorizing free tilting between them around a tilting axis that, in use, is horizontal and perpendicular to the front-back direction of the double stroller. In addition to accommodating, advantageously interchangeably, a member for receiving a first child, such as a seat or cradle, and resting on the ground by at least one pivoting front wheel, or two pivoting front wheels, and by two fixed rear wheels, that is to say, not pivoting, the frame of the stroller has a rear pushing member, as well as a rolling blocking system that, by interference with at least one of the rear wheels, makes it possible to block the rotation of the latter in order to immobilize the stroller; at the same time, the frame of the accessory accommodates, also advantageously interchangeably, its own member for receiving a second child, such as a seat or cradle, and is provided, in the rear, with its own pushing member, while resting on the ground by two pivoting wheels while, in the front, the frame of the accessory is provided with the connecting mechanism in order to connect to the rear part of the frame of the stroller, this connecting mechanism making it possible, in use, to secure the two frames in tandem while allowing the free rotational tilting thereof around the aforementioned tilting axis. Additionally, at the rear of the accessory, the frame of the latter is also provided with an actuating member making it possible to actuate a control mechanism provided at the front of the frame of the accessory so as to be able to cooperate therein with the rolling blocking system of the stroller so as to control this blocking system and thereby to control rolling blocking of the double stroller.

The maneuverability of the double stroller according to the invention is remarkable. Indeed, to be able to change the direction of advance of the double stroller, the user, who is standing up behind the double stroller, conveys a corresponding directional command to the pushing member of the accessory, which orients the pivoting front wheel(s) of the stroller in the desired direction while, by an effect similar to that of a differential, procured by the fixed rear wheels of the stroller, the pivoting wheels of the accessory orient themselves in the direction opposite the orientation direction of the front wheels of the stroller: for the user, the directional feeling is at least as fluid as the steering of a single stroller with two fixed rear wheels and one or two pivoting front wheels, despite the substantially doubled weight that the user of the double stroller must necessarily push and the majority of which is borne by the fixed rear wheels of the stroller such that the latter effectively receive all of the change of direction thrust that the user applies to the pushing member of the accessory, and pass this thrust on in opposite respective directions to the wheels of the accessory and to the front wheel(s) of the stroller, like a differential. Additionally, when the double stroller according to the invention must cross a transverse obstacle, such as a sidewalk, the double stroller behaves longitudinally like a caterpillar to cross this obstacle easily: for example, to climb up onto a sidewalk or the like, which extends transversely in front of the double stroller, the user, who is standing just behind the pushing member of the accessory, pushes the double stroller until the front wheels of the stroller are in the immediate vicinity of the sidewalk, or even abutting against the latter; then, without letting go of the pushing member of the accessory with one hand, the user grasps the pushing member of the stroller with his other hand, if applicable by placing himself on the right side or the left side of the accessory; the user can then, by manually urging the pushing member of the stroller slightly downward and rearward, tilt the frame of the stroller around the aforementioned tilting axis so as to pick the front wheel(s) of the stroller up off the ground while keeping the rear wheels of the stroller bearing on the ground, this tilting being done relative to the frame of the accessory, whose wheels have stayed in contact with the ground; by pushing forward on the pushing member of the accessory, the user can then move the double stroller forward by rolling of the rear wheels of the stroller and the wheels of the accessory, until the front wheels of the stroller are over the sidewalk; the user can next release the stress he was exerting until then on the pushing member of the stroller, which returns the front wheel(s) of the stroller into contact with the ground, at the high level of the sidewalk; the user can next push the pushing member of the accessory forward, if applicable after having placed himself behind the latter again, until the rear wheels of the stroller return near the sidewalk, or even abutting against the latter; the user can then, by manually urging the pushing member of the accessory slightly downward and rearward, tilt the frame of the accessory so as to remove the rear wheels of the stroller from the ground while keeping the wheels of the accessory bearing on ground, the frame of the stroller not hindering this tilting of the frame of the accessory subject to free tilting thereof relative to the latter around the aforementioned tilting axis; by forward pushing on the pushing member of the accessory, the user can advance the double stroller both by rolling of the wheels of the accessory on the low level of the sidewalk and by rolling of the front wheels of the stroller on the high level of the sidewalk, until the rear wheels of the stroller are over the sidewalk; the user can then release the stress he was exerting on the pushing member of the accessory, which returns the rear wheels of the stroller into contact with the ground, at the high level of the sidewalk; the user can next push the pushing member of the accessory forward, until the wheels of the accessory are close to the sidewalk, or even abutting against the latter; the user then needs only push the pushing member of the accessory, if necessary lift it slightly upward, so that the wheels of the accessory climb up onto the sidewalk and are in turn located at the high level of the sidewalk, with tilting of the frame of the accessory relative to the frame of the stroller whose front and rear wheels are resting on the high level of the sidewalk. Crossing an obstacle is therefore easy for the user, who does not need any outside help and who keeps one hand on the pushing member of the accessory at all times, which is particularly safe.

The blocking safety of the double stroller according to the invention is also remarkable. Indeed, when the user wishes to immobilize the double stroller, the user, who is standing behind the double stroller, activates the actuating member provided behind the frame of the accessory, which, due to the connection between this actuating member and the control member provided in front of the frame of the accessory, actuates this control mechanism, which, in turn, applies an appropriate command on the rolling blocking system of the stroller so that this blocking system blocks the rotation of the rear wheels of the stroller: the rolling of the double stroller is then effectively blocked because the wheels of the double stroller whose rotation is blocked by interference are those that bear the majority of the transported weight, namely the rear wheels of the stroller, irrespective of the load scenario of the double stroller, that is to say, irrespective of the actual presence and respective weight of the two children respectively able to be installed in the accessory and the stroller.

Since the connection between the stroller and the accessory of the double stroller is reversible, it is possible, when so desired by the user, to disconnect the accessory from the stroller: the stroller can continue to be used alone, as single stroller, to transport a child, the user then standing up behind the single stroller to push it in order to move forward and to actuate its rolling blocking system in order to immobilize it; at the same time, the accessory is no longer functional to transport a child, in particular due to the fact that the front of the frame of the accessory has no wheels or similar members for rolling on the ground, but the accessory remains ready to be attached to the single stroller to reform the double stroller, the connection/disconnection between them even being able to be instantaneous owing to the connection mechanism advantageously provided to be actionable with one hand by the user, as explained in more detail hereinafter.

Likewise, the accessory according to the invention can advantageously be provided to be foldable in order to take up less space and, if applicable, to be transported by the user of the stroller when the latter is used as single stroller, the folded accessory being able to be held in one hand by the user or placed over his shoulder by a strap or able to be hooked on the back of the frame of the stroller also by an ad hoc device. Of course, when the stroller is also foldable, it will be understood that the double stroller-forming assembly according to the invention can be made particularly compact, in the form of the folded accessory and the folded stroller, each of them for example being able to be allowed as carry-on luggage on board a commercial airliner.

According to one advantageous optional aspect of the accessory of the invention, the stroller accessory further includes a blocking mechanism for blocking the wheels of the stroller accessory, the blocking mechanism being borne by the rear part of the frame of the stroller accessory and being suitable for interfering reversibly with at least one or with each of the two wheels of the stroller accessory so as to block the rolling thereof irrespective of the orientation of the wheel of the stroller accessory around the pivot axis of the wheel of the stroller accessory, and the actuating member is coupled to the blocking mechanism so as to actuate the blocking mechanism jointly with actuation of the control mechanism.

Owing to this blocking mechanism, the rolling blocking of the double stroller is improved, inasmuch as, in addition to the rolling blocking, which can be described as main blocking and which is provided by the blocking system of the stroller controlled by the control mechanism of the accessory, the blocking mechanism integrated into the accessory ensures additional rolling blocking for the double stroller. Thus, even when the double stroller is in exceptional usage situations, such as very steep or uneven slopes, the blocking of the wheels of the accessory by the blocking mechanism reinforces the rolling blocking of the double stroller, which remains primarily ensured by the blocking of the rear wheels of the stroller, under the action of the blocking system integrated into this stroller. For the user, the implementation of the blocking of the wheels of the accessory does not involve any stress, since the actuation of the blocking mechanism of the accessory is done jointly with that of the control mechanism of the accessory, by urging only the actuating member behind the accessory. Thus, once the user wishes to immobilize the double stroller, the user, who is standing behind the double stroller, activates the actuating member provided behind the frame of the accessory, which simultaneously actuates the control mechanism, as explained above, and the blocking mechanism acting on the wheels of the accessory.

According to additional advantageous features of the blocking mechanism of the accessory:
the blocking mechanism includes, for at least one of the two wheels of the stroller accessory or for each of the two wheels of the stroller accessory, a blocking element, which is substantially centered on the pivot axis of the wheel of the stroller accessory and which is movable along the pivot axis of the wheel of the stroller accessory relative to the frame of the stroller accessory between:
    a disengaged position, in which the blocking element is separated from the wheel of the stroller accessory so as to leave the wheel of the stroller accessory free to roll, and
    an engaged position, in which the blocking element interferes with a tread of the wheel of the stroller accessory so as to block the rolling of the wheel of the stroller accessory.
each of the two wheels of the stroller accessory is associated with a holder:
    which is mounted on the rear part of the frame so as to pivot around the pivot axis of the wheel of the stroller accessory,
    on which the wheel of the stroller accessory is mounted rotating around itself to roll, and
    which guides the corresponding blocking element in translation along the pivot axis of the wheel of the stroller accessory.
the blocking mechanism further includes:
    for the or each blocking element, a spring that pushes the blocking element back toward the disengaged position, and
    an actuator, which is connected in movement to the actuating member and which, during joint actuation of the blocking mechanism and the control mechanism by the actuating member, drives the blocking element(s) from the disengaged position to the engaged position, while thwarting the action of the spring(s).
the or each blocking element includes a first end and a second end, which are opposite one another along the pivot axis of the corresponding wheel of the stroller accessory, the first end of the or each blocking element is provided with a first bearing surface that, when the blocking element is in the engaged position, is pressed along the pivot axis of the corresponding wheel of the stroller accessory against the tread of the corresponding wheel of the stroller accessory, and the second end of the or each blocking element is provided with a second bearing surface that, under the action of the corresponding spring, is pressed along the pivot axis of the corresponding wheel of the stroller accessory against a dedicated surface of the actuator.
the actuator is rotatable, relative to the frame of the stroller accessory, around an actuating axis that extends substantially perpendicular to the respective pivot axes of the wheels of the stroller accessory.
the rear part of the frame of the stroller accessory comprises a crosspiece:
    which extends between the two wheels of the stroller accessory,
    inside which the actuator is mounted and guided in rotation around the actuating axis, and
    on which a pedal of the actuating member is mounted tilting around the actuating axis, while being secured to the actuator.
According to other additional advantageous features of the accessory or the double stroller-forming assembly of the invention:
the control mechanism includes a holder that is:
    coupled to the front part of the frame of the stroller accessory so as to freely tilt around the tilting axis, and
    configured so as, when the stroller accessory is connected to the stroller by the connection mechanism, to partially surround the rear part of the frame of the stroller so as to be connected in rotation to the rear part of the frame of the stroller around the tilting axis,
and the control mechanism also includes a coupling member that is:
    borne movably by the holder of the control mechanism,
    coupled to the actuating member such that the actuating member drives the movement of the coupling member, and
    suitable, when the stroller accessory is connected to the stroller by the connection mechanism, for engaging the rolling blocking system of the stroller.
the coupling member is suitable, when the stroller accessory is connected to the stroller by the connection mechanism, for connecting itself in movement to an actuating part, in particular by shape matching, said actuating part belonging to the rolling blocking system of the stroller and being provided, when the stroller accessory is disconnected from the stroller, for being activated directly by a user standing behind the stroller.
the coupling member includes a yoke that is suitable for connecting itself in movement to a pedal of the actuating part, while capping the pedal.
the holder of the control mechanism includes a left branch and a right branch, as well as a bar that fixedly couples the left and right branches to one another, and the left and right branches are coupled in rotation to the rear part of the frame of the stroller around the tilting axis when the stroller accessory is connected to the stroller by the connection mechanism, while being configured so as to partially surround left and right uprights, respectively, of the rear part of the frame of the stroller.
the connection mechanism includes a bearing part:
    which supports and guides the movement of the rest of the connection mechanism,
    on which the holder of the control mechanism is mounted so as to tilt around the tilting axis, and
    which is integrated into a footrest borne by the front part of the frame of the stroller accessory.
the stroller accessory further includes a mechanical transmission system, which is borne by the frame of the stroller accessory, while extending between the front and rear parts of the frame of the stroller accessory, and which mechanically couples the actuating member and the control mechanism such that the actuating member actuates the control mechanism.
the mechanical transmission system includes cables that couple the actuating member and the coupling member to one another such that the actuating member drives the movement of the coupling member.
the frame of the stroller accessory is suitable, when the stroller accessory is disconnected from the stroller, for being folded between a usage configuration, in which the stroller accessory can be connected to the stroller by the connection mechanism, and a storage configuration, which is more compact than the usage configuration.
the two wheels of the stroller accessory are separated, perpendicular to the front-back direction, by a path that is larger than a path separating, perpendicular to the front-back direction, the two rear wheels of the stroller.

The invention will be better understood upon reading the following description, provided solely as an example and done in reference to the drawings, in which.

Figure 1:
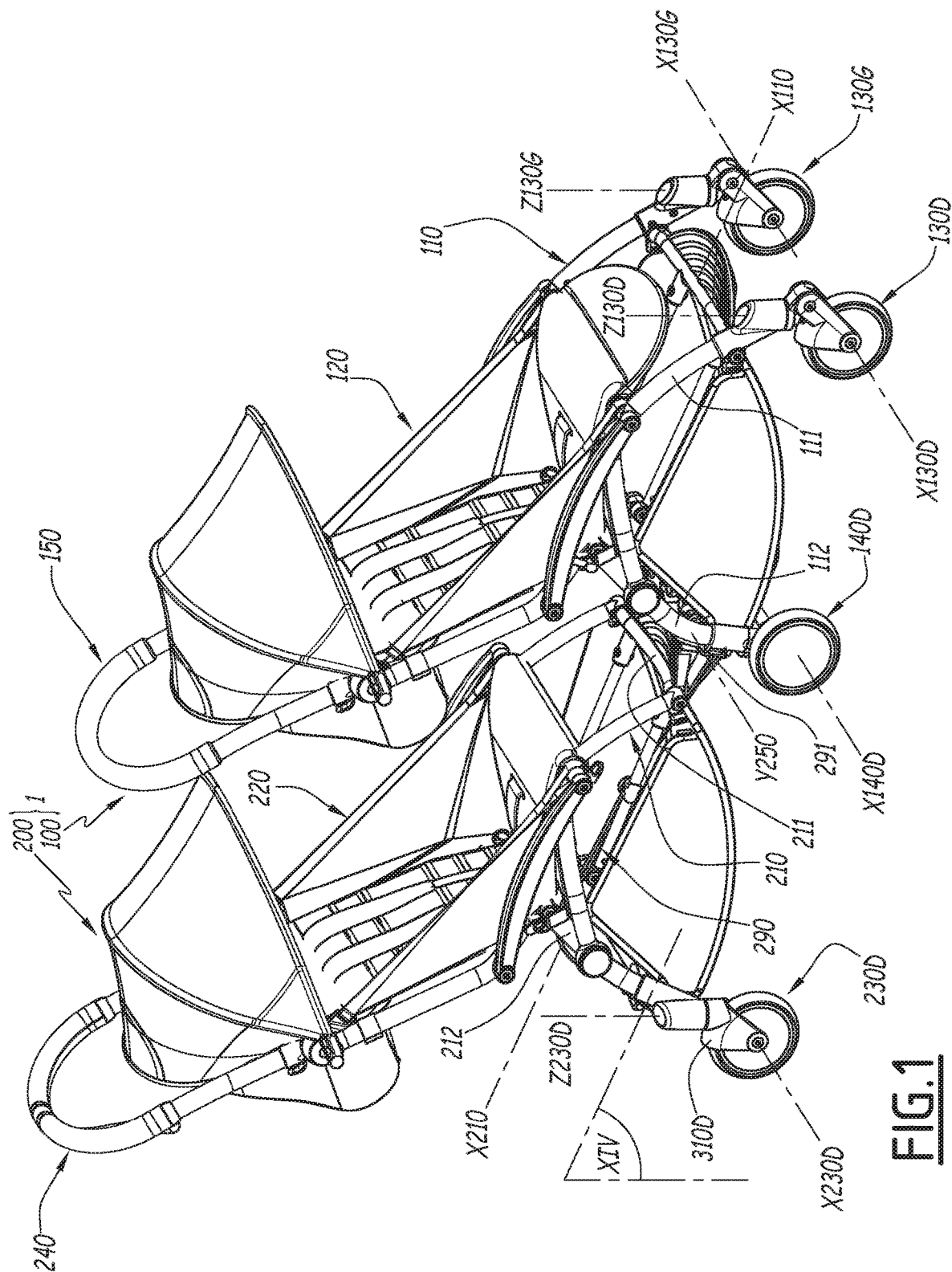
FIG. 1 is a perspective view of a double stroller-forming assembly according to the invention.

FIGS. 1, 2, 9 and 10 show a double stroller 1 formed by an assembly made up of a stroller 100 and a stroller accessory 200. In FIGS. 4 to 8, the stroller 100 and the accessory 200 are only partially shown. In FIGS. 3 and 11 to 13, only the accessory 200 is shown. The stroller 100 and the accessory 200 will be described in detail hereinafter, one after the other.

The stroller 100 includes a frame 110 that defines a front-back axis X110. The front-back axis X110 extends between a front region of the frame 110, which faces toward the front when the stroller 100 is pushed forward, and a back region of the frame, which is opposite the aforementioned front region and which therefore faces the back when the stroller 100 is pushed forward. Additionally, the front-back axis X110 is located substantially in the middle of the frame 110 in the direction where this front-back axis extends at substantially the same distance from the left lateral side and the right lateral side of the frame 110.

In the exemplary embodiment considered in the figures, the frame 110 has a tubular structure, made primarily by assembling tubes. This tubular structure is advantageously able to be folded on itself to transition the frame 110 between a deployed usage configuration, as shown in FIGS. 1, 2 and 4 to 10, and a folded storage configuration. In this respect, the reader may for example refer to WO 2010/000987 to see possible corresponding embodiment details.

Irrespective of its embodiment, the frame 110 is designed in order, during use, to support a receiving member 120 making it possible to receive a first child to be transported by the double stroller 1, this first child being installed in this receiving member 120 in the seated position, in the reclining position or in a position midway between the latter. Thus, the receiving member 120 is chosen from among a seat, a cradle, a bassinet, etc., the embodiment of the receiving member 120 not being limiting with respect to the invention. Furthermore, in a manner known in itself and not described in detail here, the frame 110 is advantageously provided to make it possible to interchange the receiving member 120, in particular depending on the age of the first child to be transported.

The stroller 100 also includes wheels that, during use, bear and roll on the ground, while being arranged in the lower region of the frame 110 in order to support the latter.

Among the wheels of the stroller 100, there is a front left wheel 130G and a front right wheel 130D. Each of these wheels 130G and 130D defines an axis of rotation, respectively left X130G and right X130D, around which the wheel rotates on itself to roll on the ground. During use, the axes of rotation X130G and X130D extend substantially parallel to the ground. The front left wheel 130G is mounted on a left portion of a front part 111 of the frame 110, while being coupled to this left portion freely pivoting around a pivot axis Z130G that extends radially or orthoradially with respect to the axis of rotation X130G of the front wheel 130G, such that the front left wheel 130G can, independently of its rolling around its axis of rotation X130G, pivot around the pivot axis Z130G and thus modify the orientation of the wheel relative to the frame 110 and therefore the direction of progression for the frame 110 on the ground. The front left wheel 130G can thus be described as "pivoting wheel", sometimes called "idler wheel". Likewise, the front right wheel 130D is mounted on a right portion of the front part 111 of the frame 110, while being coupled to this right portion freely pivoting around a pivot axis Z130D, which extends radially or orthoradially with respect to the axis of rotation X130D of the front right wheel 130D and which is substantially parallel to the pivot axis Z130G. To improve the maneuverability of the wheels 130G and 130D, their pivot axis Z130G and Z130D is not concurrent with their axis of rotation X130G, X130D, but is advantageously offset from this axis, such that the pivot axis of each wheel is offset with respect to the axis of rotation of the wheel. In practice, the arrangement and developments inherent to the wheels 130G and 130D are not limiting inasmuch as these wheels are pivoting and provided in front of the frame 110.

Also among the wheels of the stroller 100, there is a left rear wheel 140G and a right rear wheel 140D. The left 140G and right 140D rear wheels respectively define a left axis of rotation X140G and a right axis of rotation X140D, respectively around which the corresponding wheel rotates to roll on the ground and which, in use, extends substantially parallel to the ground. The left rear wheel 140G is mounted on a left portion of a rear part 112 of the frame 110, while being coupled to this left part fixedly, that is to say, not pivoting compared to the front wheels 130G and 130D.

Likewise, the rear right wheel 140D is mounted on a right portion of the rear part 112 of the frame 110, while being coupled to this right portion fixedly. In the exemplary embodiment considered in the figures, the left X140G and right X140D axes of rotation are aligned, the left 140G and right 140D rear wheels thus forming a fixed train of rear wheels, centered on a same axis of rotation.

Figure 4:
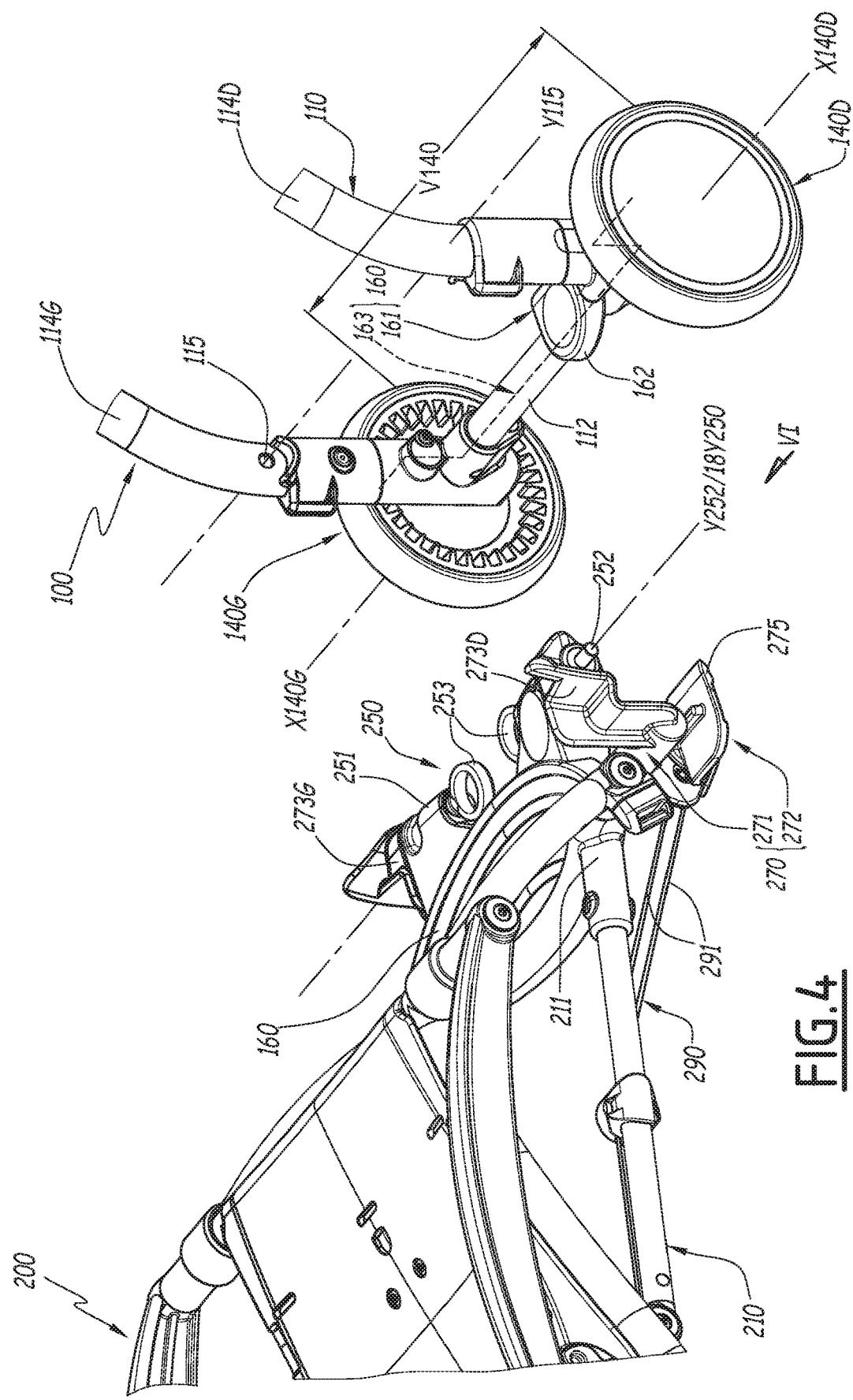
FIG. 4 is a perspective view showing both the back of a stroller belonging to the double stroller-forming assembly of FIGS. 1 and 2 and the front of the accessory of FIG. 3, this stroller and this accessory being disconnected from one another.

As indicated in FIG. 4, reference V140 denotes the path that separates the left 140G and right 140D rear wheels in a direction perpendicular to the front-back axis X110.

The stroller 100 further includes a pushing member 150 that is securely carried by the rear part 112 of the frame 110, in the upper region of this rear part. During use, the pushing member 150 is located at the height of the hands of an adult user, standing upright, positioned behind the stroller 100 and, if applicable, offset to the left or right of the front-back axis X110. The pushing member 150 allows the user to apply, on the frame 110, a manual stress in particular seeking either to push the frame 110 forward, by rolling the frame on the ground via the wheels 130G, 130D, 140G and 140D, or to lift the rear region of the frame 110 slightly so as to pick up the rear wheels 140G and 140D with respect to the ground, while keeping the front wheels 130G and 130D in contact with the ground, or to pick up the front wheels 130G and 130D with respect to the ground by tilting the rear region of the frame 110 backward and downward, while keeping the back wheels 140G and 140D in contact with the ground. The pushing member 150 is for example made in the form of a bar, handle, etc. More generally, the embodiment of the pushing member 150 is not limiting with respect to the invention.

Figure 5:
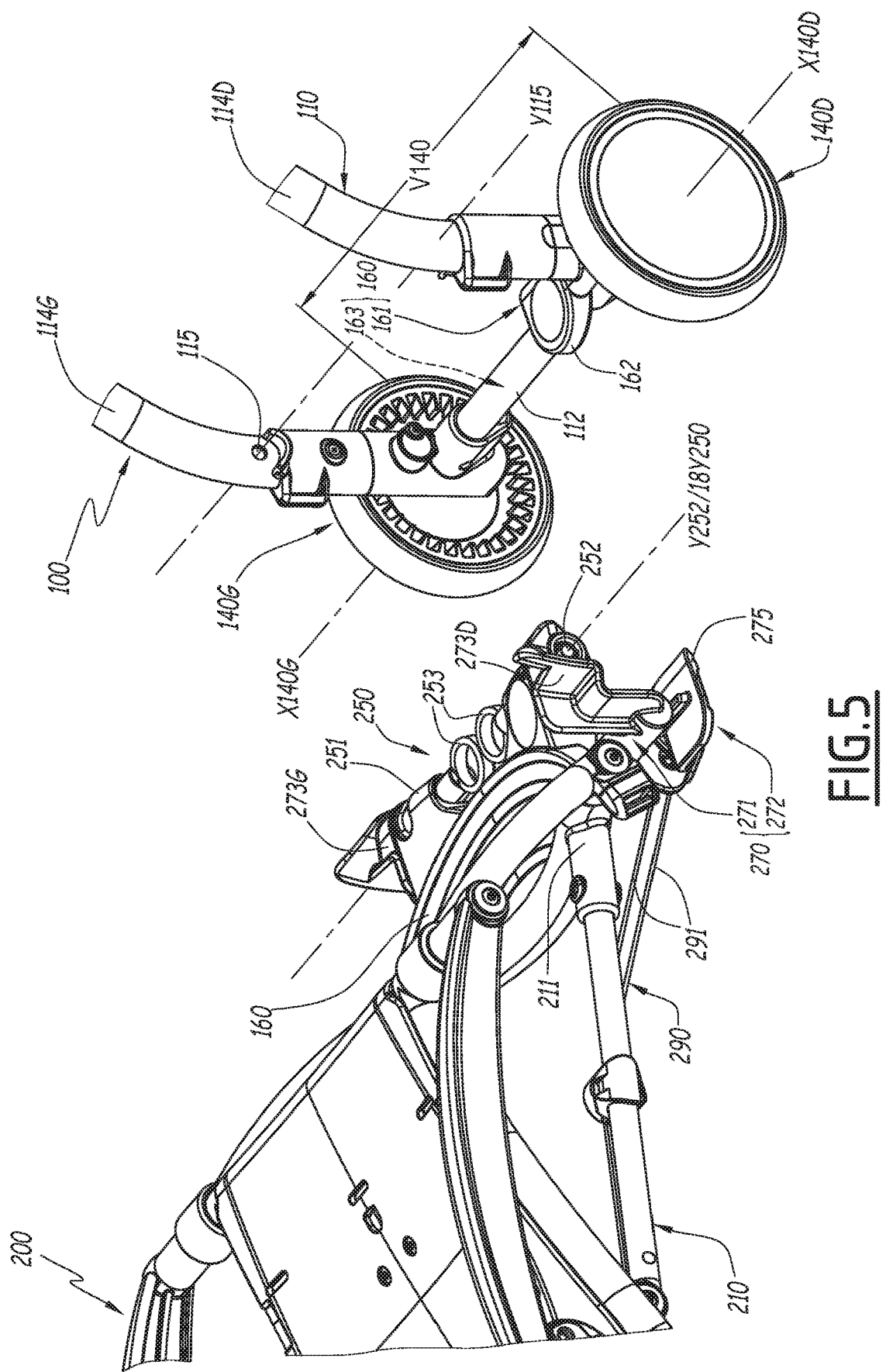
FIG. 5 is a view similar to FIG. 4, illustrating a step carried out to connect the stroller and the accessory to one another.
Figure 6:
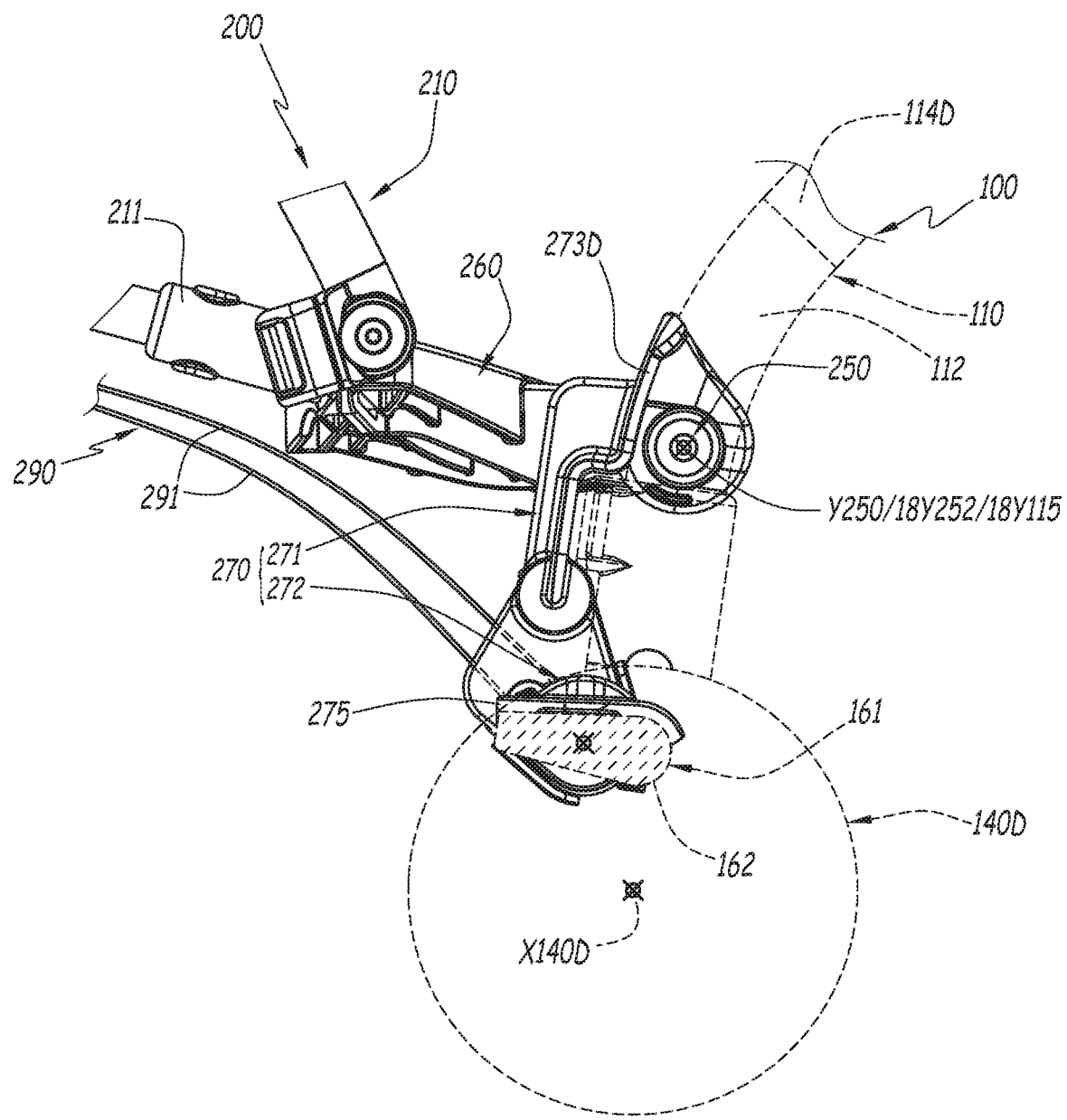
FIG. 6 is an elevation view along arrow VI of FIG. 4, illustrating the stroller and the accessory connected to one another and showing the accessory in solid lines while the stroller is shown only partially and in dotted lines.
Figure 7:
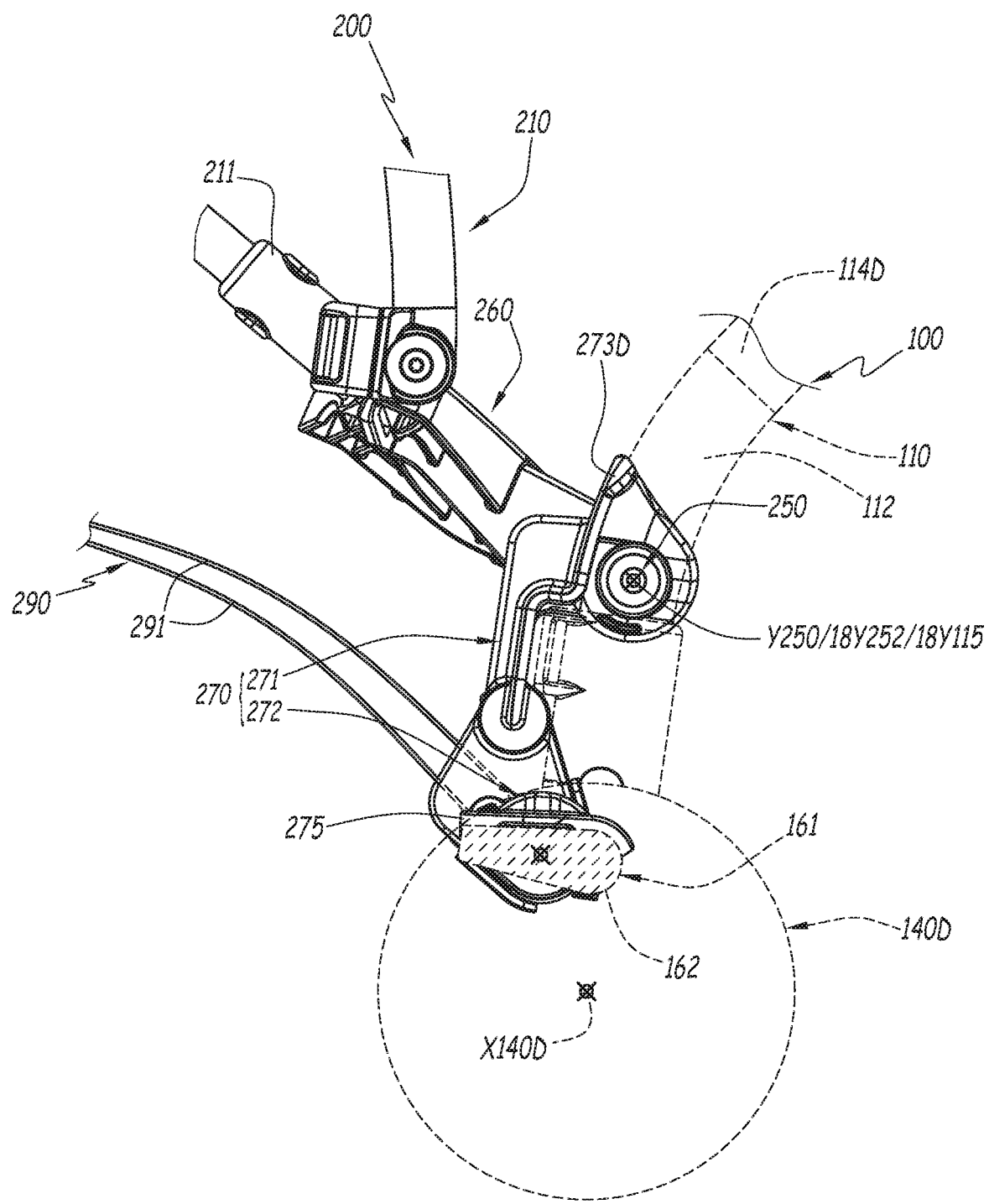
FIG. 7 is a view similar to FIG. 6, illustrating a relative tilting between the stroller and the accessory.
Figure 8:
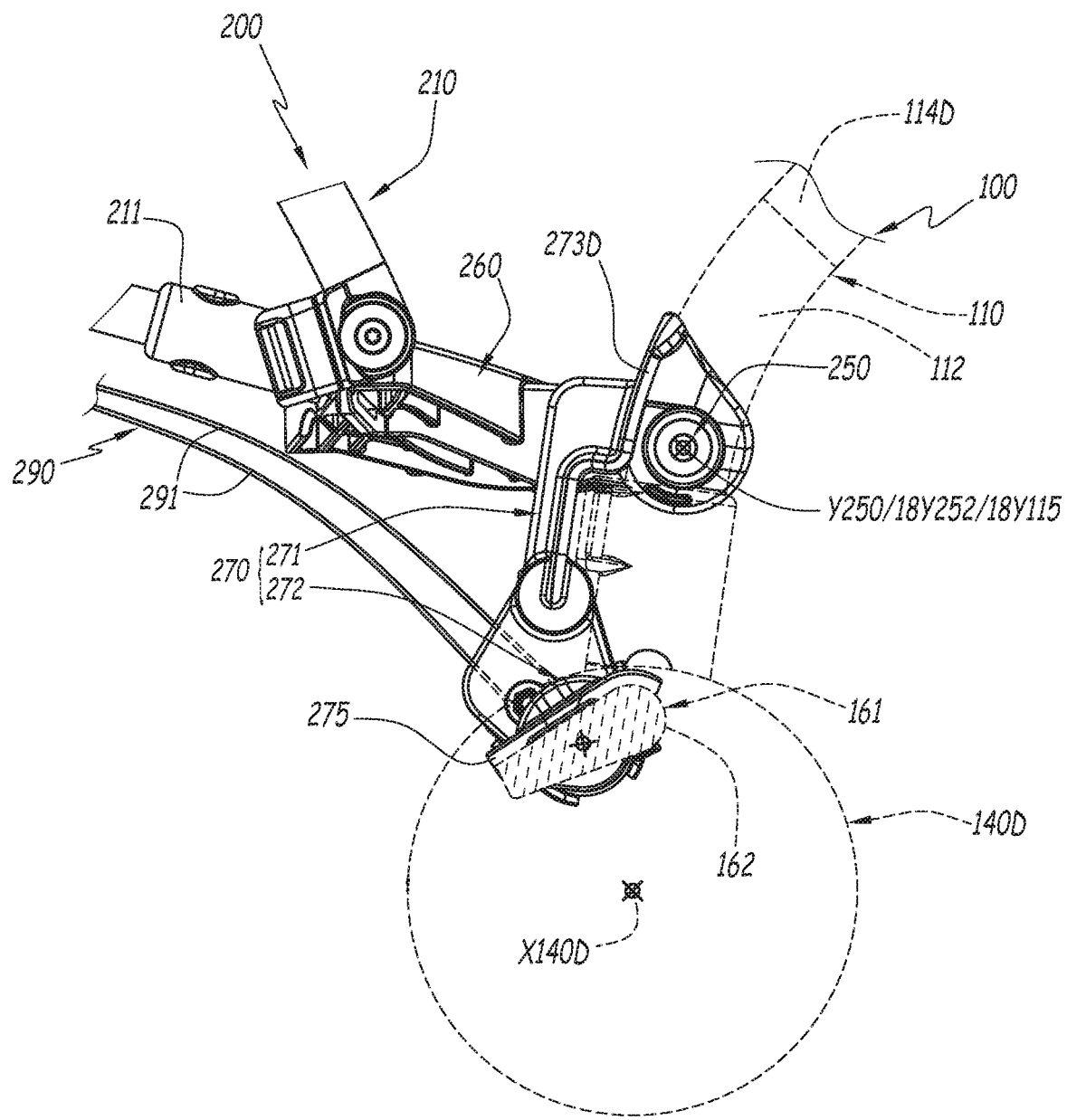
FIG. 8 is a view similar to FIG. 6, illustrating the actuation of a system for blocking the rolling of the stroller.

The stroller 100 also includes a rolling blocking system 160, which is borne by the frame 110 and which makes it possible to immobilize the stroller 100 by blocking its rear wheels 140G and 140D in rotation around their axis of rotation X140G, X140D. This rolling blocking system 160 is designed to be urged by a user standing behind the stroller 100 and to that end includes an actuating part 161 borne by the rear part 112 of the frame 110 so as to be able to be activated, for example by the foot or hand, by the user. In the exemplary embodiment considered in the figures, the actuating part 161 includes, or even consists of a tilting pedal 162, as clearly shown in FIGS. 4 and 5. Additionally, the rolling blocking system 160 includes a blocking mechanism 163, which makes it possible to block the rotation of the rear wheels 140G and 140D by interfering with the latter and which is reversibly actuated by the actuating part 161: this blocking mechanism 163, which is not described in detail in the figures and which is drawn in dotted lines schematically in FIGS. 4 and 5, is designed to move, relative to one another, rear wheels 140G and 140D, a blocking element, associated with the corresponding wheel, the or each blocking element thus being moved between a blocking position, in which the blocking element cooperates by abutment, in particular in a peripheral direction with respect to the axis of rotation X140G, X140D of the associated wheel, with a relief of this wheel so as to prohibit the wheel from rolling irrespective of the angular position of this wheel around its axis of rotation, and an unblocking position, in which the blocking element does not interfere with the aforementioned relief of the associated wheel. The movement of the aforementioned blocking element(s) by the blocking mechanism 163 is thus commanded by the actuating part 161. Embodiment details of an example of such a blocking mechanism 163 are given in WO 2011/148062, to which the reader may refer. Of course, this embodiment of the blocking mechanism 163, like the embodiment of the actuating part 161, are not limiting with respect to the invention inasmuch as this blocking mechanism, controlled by the actuating part, makes it possible to interfere with one and/or the other of the rear wheels 140G and 140D so as to block the rotation of the latter, reversibly.

Other features of the stroller 100 will be disclosed later, after the accessory 200 has been described in turn.

The accessory 200 includes a frame 210 that defines a front-back axis X210 extending between respective front and back regions of the frame 210, which respectively face toward the front and toward the back when the accessory 200 is moved toward the front during use. This front-back axis X210 is located at substantially the same distance from the left and right lateral sides, respectively, of the frame 210.

In the exemplary embodiment considered in the figures, the frame 210 has a tubular structure, for example made primarily by assembling tubes. One interest of this tubular structure will be provided later. That being said, other embodiments can be considered for the frame 210, the aforementioned tubular structure not being limiting with respect to the invention.

The accessory 200 includes a receiving member 220 that, during use, is supported by the frame 210. The receiving member 220 makes it possible to receive a second child to be transported by the double stroller 1, that is to say, a child other than the one transported in the stroller 100, this second child being installed in the receiving member 220 in the seated position, in the reclined position or in a position midway between the latter. In practice, the receiving member 220 is a seat, a cradle, a bassinet, etc. According to considerations similar to those developed above for the receiving member 120, the receiving member 220 is advantageously supported by the frame 210 interchangeably, thus making it possible to change the nature of the receiving member 220 depending on the age of the second child to be transported by the double stroller 1. In all cases, it will be noted that the receiving member 120 and the receiving member 220 are independent from one another, in that the respective natures of these two receiving members are indifferent from one another.

The accessory 200 further includes left 230G and right 230D wheels. These wheels, respectively left 230G and right 230D, define axes of rotation, respectively left X230G and right X230D, around which the corresponding wheel rotates around itself to roll on the ground. The wheel 230G is mounted on a left portion of a rear part 212 of the frame 210, while being coupled to this left portion freely pivoting around a pivot axis Z230G that extends radially or orthoradially with respect to the left axis of rotation X230G, such that the left wheel 230G can, independently of its rolling around its axis of rotation X230G, pivot freely around the pivot axis Z230G and thus modify the orientation of the left wheel 230G relative to the frame 210 and therefore the direction of progression for the frame 210 on the ground. Likewise, the right wheel 230D is mounted on a right portion of the rear part 212 of the frame 210, while being coupled to this right portion freely pivoting around a pivot axis Z230D extending radially or orthoradially with respect to the right axis of rotation X230D and substantially parallel to the left pivot axis Z230G. According to considerations similar to those developed above for the front wheels 130G and 130D, it will be understood that the wheels 230G and 230D can be described as pivoting wheels or idler wheels with respect to the frame 210. To improve the maneuverability of the wheels 230G and 230D, their pivot axis Z230G and Z230D is not concurrent with their axis of rotation X230G, X230D, but is advantageously offset from this axis, such that the pivot axis of each wheel 230G and 230D is offset with respect to its axis of rotation. This being the case, the arrangement and the developments inherent to the wheels 230G and 230D are not limiting and can differ from the exemplary embodiment considered in the figures, inasmuch as these wheels 230G and 230D are pivoting and support the rear part 212 of the frame 210.

Figure 2:
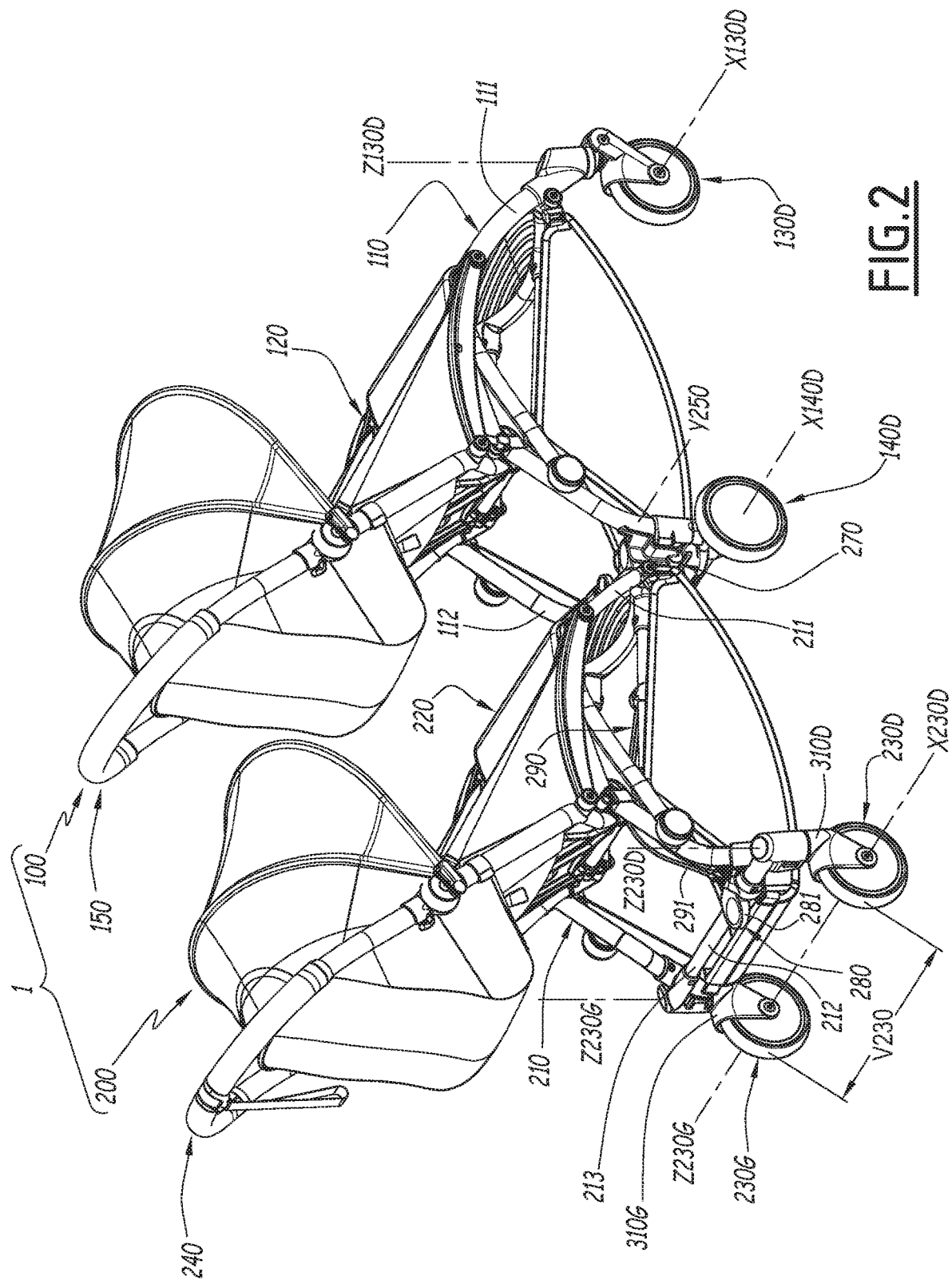
FIG. 2 is a view similar to FIG. 1, in an observation direction different from that of FIG. 1.

As indicated in FIG. 2, the left 230G and right 230D wheels are separated from one another, perpendicular to the front-back axis X210, by a path V230.

The accessory 200 further includes a pushing member 240 that is securely carried by the rear part 212 of the frame 210, in the upper region of this rear part. During use, the pushing member 240 is located at the height of the hands of an adult standing, and if applicable, walking behind the double stroller 1, the pushing member 240 thus allowing the user to urge the frame 210 manually, in particular in order to push this frame 210 forward, to slightly lift the rear region of this frame 210 so as to pick up the wheels 230G and 230D off the ground, or to tilt the rear part 212 of the frame 210 slightly backward and downward while keeping the wheels 230G and 230D in contact with the ground. In practice, the embodiment of the pushing member 240 is not limiting, this pushing member 240 being able to be a bar, handles, etc. In the exemplary embodiment considered in the figures, the respective embodiments of the pushing member 150 and the pushing member 240 are identical, but this could be different.

The accessory 200 further includes a connection mechanism 250 making it possible to connect the stroller 100 and the accessory 200 to one another reversibly, and if applicable, instantaneously as explained later. As clearly shown in FIGS. 1 to 8, the connection mechanism 250 is borne by a front part 211 of the frame 210, in the lower region of this front part, and is designed to cooperate with a lower region of the rear part 112 of the frame 110 in order to removably secure the front part 211 of the frame 210 to the rear part 112 of the frame 110. The securing between the frames 110 and 210 is thus done by the connecting mechanism 250 such that the accessory 200 is arranged behind the stroller 100 in a front-back direction of the double stroller 1, which extends perpendicular to the front-back axes X110 and X210 of the frames 110 and 210. The front-back axes X110 and X210 are also advantageously aligned by the connecting mechanism 250, like in the exemplary embodiment considered in the figures. Furthermore, as indicated in FIGS. 1, 2 and 6 to 8, the connecting mechanism 250 is suitable, through ad hoc mechanical developments, for defining a tilting axis Y250 around which the rear part 112 of the frame 110 and the front part 211 of the frame 210 tilt freely relative to one another. This tilting axis Y250 extends, during use, substantially parallel to the ground and substantially perpendicular to the front-back direction of the double stroller 1. Thus, outside the play inherent to the connecting mechanism 250, the frames 110 and 210 are fixedly connected to one another by the connecting mechanism 250 in all directions, except in tilting around the tilting axis Y250 around which the frames 110 and 210 are freely movable relative to one another. In the exemplary embodiment considered in the figures, the tilting axis Y250 thus extends parallel to and at a distance from the rotation axes X140G and X140D of the rear wheels 140G and 140D.

In practice, the embodiment of the connecting mechanism 250 is not limiting with respect to the invention, inasmuch as this connecting mechanism provides the reversible securing between the front part 211 of the frame 210 and the rear part 112 of the frame 110, while allowing free tilting between them around the tilting axis Y250. In particular, irrespective of the embodiment of the connecting mechanism 250, the stroller 100 and the accessory 200 can, when the user so commands, be disconnected from one another as considered in FIGS. 3 to 5.

Figure 3:
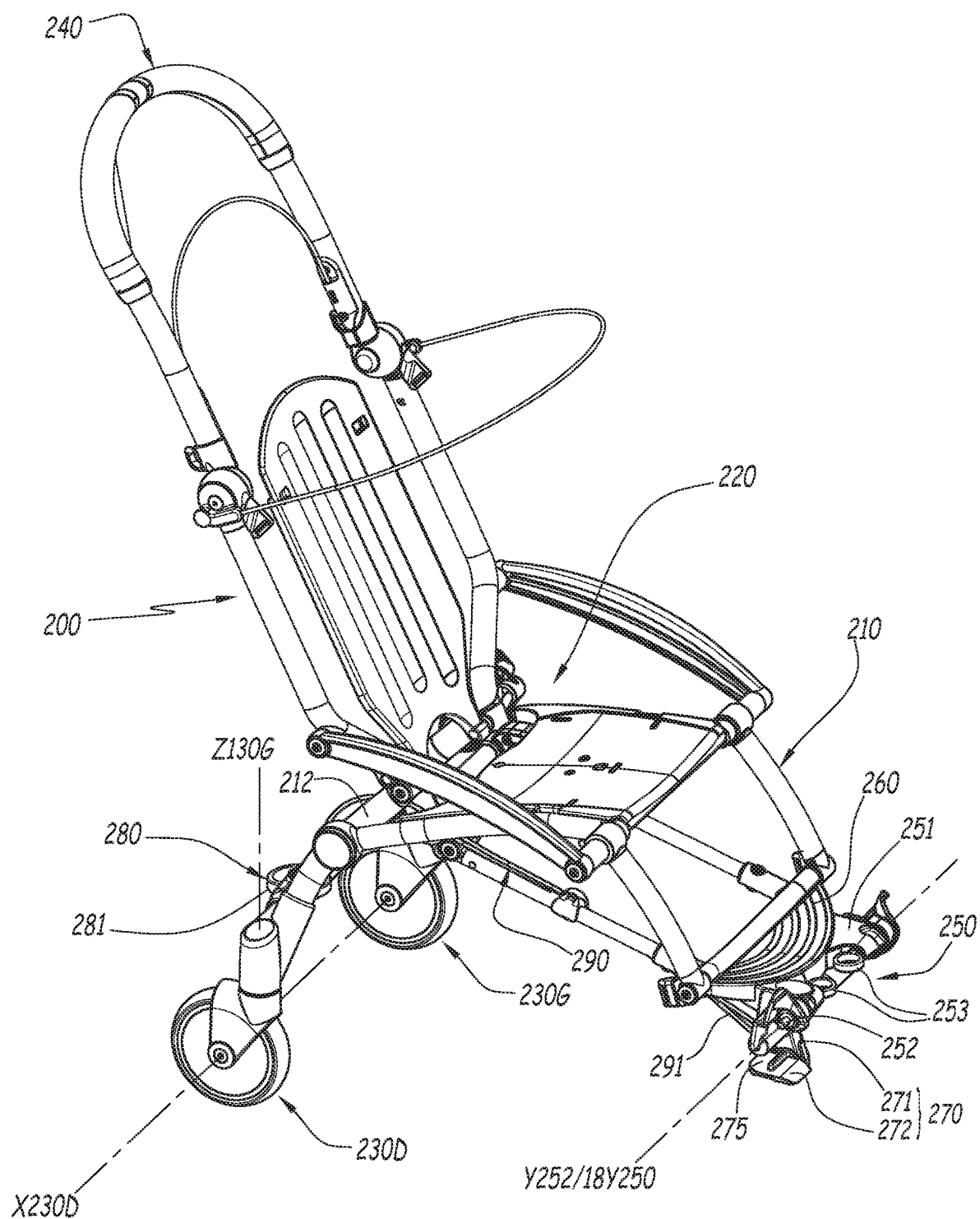
FIG. 3 is a perspective view of an accessory according to the invention and belonging to the double stroller-forming assembly of FIGS. 1 and 2, this accessory being shown alone in FIG. 3.

In the exemplary embodiment considered in the figures, and more specifically visible in FIGS. 3 to 5, the connecting mechanism includes a bearing part 251 that, during use, is fixedly secured to the frame 210, while being fixedly borne, in particular permanently borne, by the front part 211 of the frame 210. In particular, according to one particularly advantageous embodiment that is implemented here, the bearing part 251 is permanently integrated into a footrest 260 securely borne by the front part 211 of the frame 210. The connecting mechanism 250 also includes two male elements 252, namely a left male element and a right male element, which are centered on a same geometric axis Y252, having noted that only the right element of the elements 252 is visible in FIGS. 3 and 4 and that the left element is symmetrical to the right element relative to a geometric plane that is both perpendicular to the axis Y252 and contains the front-back axis X210. Each of the two male elements 252 is supported by the support part 251 movably relative to the frame 210, between a connection position, which is shown in FIGS. 3 and 4 and in which the male element 252 is deployed with respect to the bearing part 251, and a disconnection position, which is shown in FIG. 5 and in which the male element is retracted with respect to the bearing part. The male elements 252 in the connection position are provided to cooperate with the rear part 112 of the frame 110. To that end, the left portion of the rear part 112 of the frame 110 includes a left rear upright 114G and the right portion of this rear part 112 of the frame 110 includes a right rear upright 114B, these uprights 114G and 114D being parallel to one another, while extending upward respectively from the left 130G and right 130D rear wheels, as clearly shown in FIGS. 4 and 5. Additionally, the left and right portions of the rear part 112 of the frame 110 are each provided with a female housing 115: these two female housings 115 are centered on a same geometric axis Y115, and extend perpendicular to the left 114G and right 114D uprights, and are respectively hollowed out in a face of the left upright 114G and in a face of the right upright 114D, which are facing one another, these female housings 115 extending respectively inside uprights 114G and 114D advantageously in the thickness of an inner insert of these uprights, having noted that only the left housing of the two housings 115 is visible in FIGS. 4 and 5 and that the right housing is symmetrical to the left housing relative to a geometric plane that is both perpendicular to the axis Y115 and contains the front-back axis X110. When the connection mechanism is attached to the rear part 112 of the frame 110, in particular between the uprights 114G and 114D, more specifically at female housings 115, the male elements 252 are, in the connection position, respectively received in these female housings 115, while the male elements 252 are, in the disconnection position, outside the female housings 115. Each of the male elements 252 is provided to be complementary, to within any functional play, to the female housing 115 with which it is associated, so as to be received in this female housing in a complementary manner: by providing that the male elements 252 and the female housings 115 have a complementary cylindrical configuration, centered on their respective axes Y252 and Y115, these male elements, when they are received in the female housings, cooperate with these female housings to align their respective axes Y252 and Y115 and to jointly define the tilting axis Y250, which is then combined with the aligned axes Y252 and Y115. According to one particularly advantageous practical provision, the male elements 252 are translatable along their axis Y252, and therefore along the tilting axis Y250, between their connection position and their disconnection position, in particular while coming closer to one another when these male elements are translated from their connection position to their disconnection position, as clearly shown by comparing FIGS. 4 and 5. Furthermore, the connection mechanism 250 further includes drive members 253, namely a left drive member and a right drive member, which respectively make it possible to drive the male elements 252 manually from their connection position to their disconnection position, these drive members advantageously being configured to be urged jointly by a same hand of a user in order to drive the two male elements jointly. The connection mechanism 250 can also include resilient members that provide the resilient return of the male elements 252 from their disconnection position to their connection position, while resiliently keeping the male elements in their connection position as long as the user does not apply a manual stress on the drive members 253 overcoming the resilient resistance of the aforementioned resilient members with a view to driving the male elements 252 from their connection position to their disconnection position.

More details relative to the embodiment of the connection mechanism 250 described just above are given in WO 2018/050303, to which the reader can refer.

In practice, the bearing part 251 supports and guides the movement of the aforementioned resilient members, the drive members 253 and the male elements 252: more generally, irrespective of the embodiment of the connection mechanism 250, the bearing part 251 is advantageously provided to support and guide the movement of the rest of this connection mechanism, in particular for reliability and performance reasons. This bearing part 251 can also be provided to cooperate by shape matching with ad hoc arrangements of the lower part 112 of the frame 110 in order to facilitate the relative positioning between the frames 110 and 210 during their connection by the connection mechanism 250, in particular the positioning of the female housings 115 with respect to the male elements 252 in the disconnection position just before these male elements are moved to their connection position.

The accessory 200 also includes a control mechanism 270 that makes it possible to control a rolling blockage of the double stroller 1. As clearly shown in FIGS. 3 to 8, the control mechanism 270 is borne by the front part 211 of the frame 210 and is provided, when the accessory 200 is connected to the stroller 100 by the connection mechanism 250, to cooperate mechanically with the rolling blocking system 160 of the stroller 100 so as to control this rolling blocking system 160. In order to actuate the control mechanism 270, the accessory 200 also includes an actuating member 280 that, as shown in FIGS. 2 and 3, is borne by the rear part 212 of the frame 210 so as to be able to be activated by a user standing behind the double stroller 1. The embodiment of the actuating member 280 is not limiting inasmuch as this actuation can be activated by the user, for example by foot or hand: in the exemplary embodiment considered here, the actuating member 280 includes, or even consists of, a pedal 281 that, as clearly shown in FIG. 2, is mounted movably, for example mounted with tilting, on a crosspiece 213 of the rear part 212 of the frame 210, extending between the wheels 230G and 230D. In all cases, the actuating member 280 is coupled to the control mechanism 270 so as to actuate the latter.

In practice, in order to transmit the activation of the actuating member 280 reliably and lastingly to the control mechanism 270, the accessory 200 includes a mechanical transmission system 290, which mechanically couples the actuating member 280 and the control mechanism 270 so as to be able to actuate the control mechanism 270 when the user acts on the actuating member 280. This transmission system 290 is borne by the frame 210 while extending between the front part 211 and the rear part 212 of the frame 210.

According to one particularly practical and effective embodiment, which is implemented in the example considered in the figures, the control mechanism 270 primarily includes two assemblies that are movable relative to one another, namely a support 271 and a coupling member 272.

The support 271 is coupled to the front part 211 of the frame 210 tilting freely around the tilting axis Y250. In particular, the support 271 is advantageously carried by the connection mechanism 250, while being mounted tilting around the tilting axis Y250 on the bearing part 251, as clearly shown in FIGS. 3 to 5. Thus, when the accessory 200 is disconnected from the stroller 100, the support 271 is freely tiltable relative to the frame 210 around the tilting axis Y250, the travel of this free tilting being able to be limited by ad hoc mechanical stops. When the accessory 200 is connected to the stroller 100 by the connection mechanism 250, the support 271 is designed to be connected in rotation to the rear part 112 of the frame 110 around the tilting axis Y250, owing to a configuration of this support 271 such that this support 271 partially surrounds the rear part 112 of the frame 110, as shown in FIG. 2 and as illustrated schematically in FIGS. 6 to 8. It will be understood that, when the accessory 200 is connected to the stroller 100 by the connection mechanism 250, the frames 110 and 210 are freely tiltable relative to one another around the tilting axis Y250, as explained above, while the support 271, kept in surrounding contact with the rear part 112 of the frame 110, follows the movement of the frame 110 relative to the frame 210, as shown by comparison between FIGS. 6 and 7.

Figure 12:
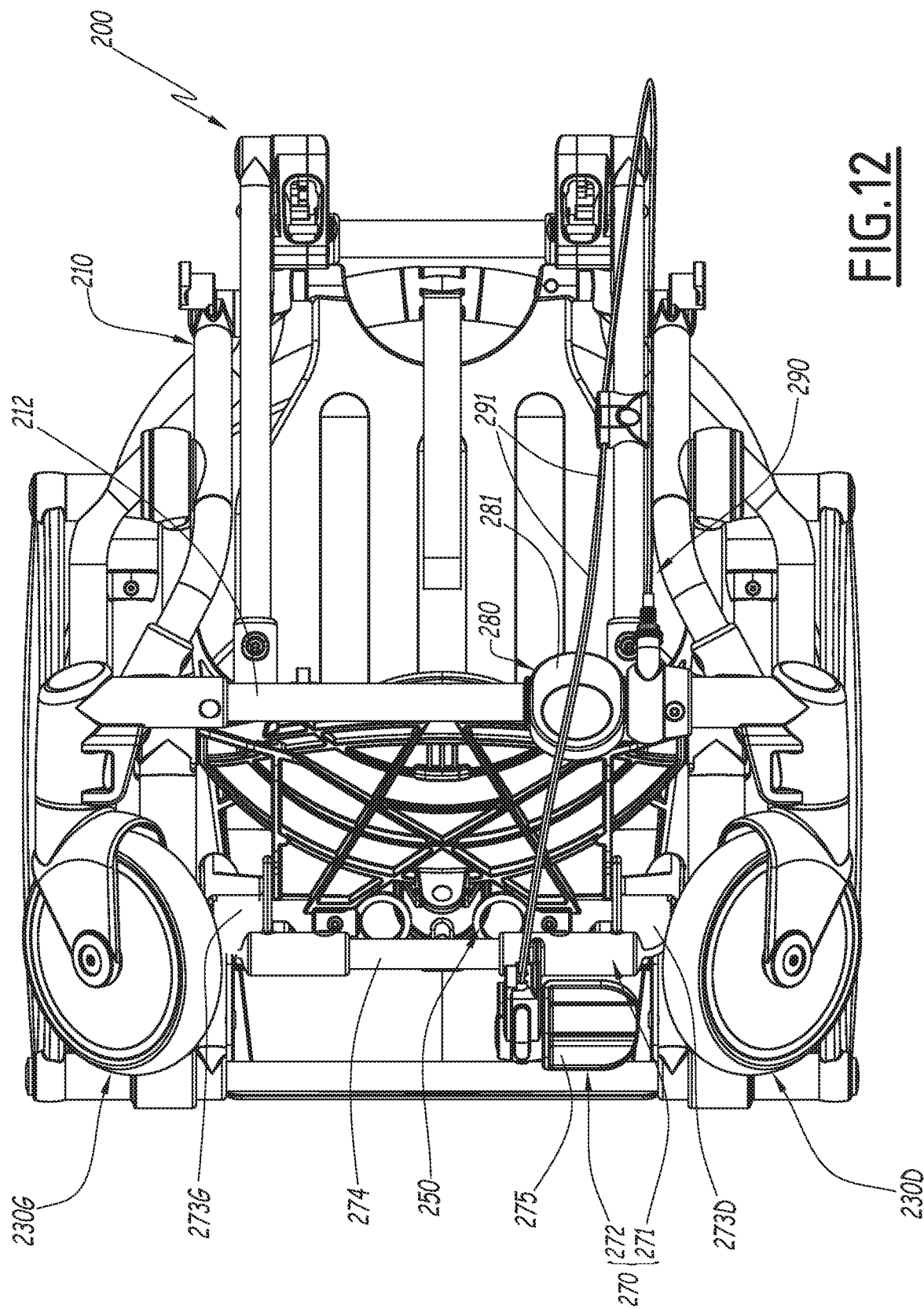
FIG. 12 is a view similar to FIG. 11, in an observation direction different from that of FIG. 11.

In particular for mechanical stability reasons, the support 271 can, like in the example considered in the figures, include a left branch 273G and a right branch 273D, as well as a bar 274 that is more particularly visible in FIG. 12 and that fixedly couples the left 273G and right 273D branches to one another, in particular while extending parallel to the tilting axis Y250. The left 273G and right 273D branches are provided respectively to bear against the left upright 114G and the right upright 114D of the rear part 112 of the frame 110 when the accessory 200 is connected to the stroller 100 by a connection mechanism 250: as clearly shown in FIGS. 2 and 6 to 8, each of these branches 273G and 273D is configured so as to partially surround the corresponding upright 114G, 114D of the rear part 112 of the frame 110, so as to be connected in rotation to this rear part 112 of the frame 10 around the tilting axis Y250.

The coupling member 272 is in turn movably borne by the support 271, while being coupled to the actuating member 280, in particular by the mechanical transmission system 290, such that the actuating member 280 can drive the movement of this coupling member 272. According to one practical, economical and reliable embodiment, the mechanical transmission system 290 includes, or even consists of cables 291 directly coupling the actuating member 280 and the coupling member 272 to one another such that the actuating member 280 drives the movement of the coupling member 272 with respect to the support 271 by tension/release of the cables 291. These cables 291 are partially visible in FIGS. 1 to 8.

Additionally, the coupling member 272 is suitable, in particular due to its shape, for being connected in movement, in particular by shape matching, with the actuating part 161 of the rolling blocking system 160 of the stroller 100: in the exemplary embodiment considered in the figures, the coupling member 272 thus includes, or even consists of a yoke 275 that, when the accessory 200 is connected to the stroller 100, caps the paddle 162 of the actuating part 161 and is connected in movement with the latter by shape matching relative to one another. Owing to the shape matching between the coupling member 272 and the actuating part 161, the coupling member 272 is connected in movement with the actuating part 161 as of the connection of the accessory 200 with the stroller 100 by the connection mechanism 250, in particular without needing to add an additional fastening means between them. In all cases, by connecting itself in movement to the actuating part 161, the coupling member 272 engages the rolling blocking system 160 of the stroller 100 when the accessory 200 is connected to the latter, so as to control this rolling blocking system 160.

In practice, it will be understood that the degree of mobility between the coupling member 272 and the support 271 depends on the embodiment of the rolling blocking system 160. Thus, in the exemplary embodiment considered in the figures, the reversible actuation of the blocking mechanism 163 of the rolling blocking system 160 is done by tilting of the actuating part 161, in particular of the pedal 162, around an axis parallel to the tilting axis Y250: the coupling member 272, in particular the yoke 275, can therefore be provided to tilt relative to the support 271 around a tilting axis that is also parallel to the tilting axis Y250 and that is aligned with the tilting axis of the actuating part 161 when the accessory 200 is connected to the stroller 100 by the connection mechanism 250. More generally, the control mechanism 270, in particular its coupling member 272, is designed to cooperate mechanically, in particular to engage, an appropriate part, such as the actuating part 161, of the rolling blocking system 160 of the stroller 100 when the latter is connected to the accessory 200.

By taking account of the description given thus far for the double stroller 1, it will be understood that, outside developments of the stroller 100 that allow the connection between the latter and the accessory 200, the stroller 100 can typically fall under what is known for existing single strollers, that is to say, strollers with a single permanent spot. In particular, although the stroller 100 occupies the front region of the double stroller 1, this stroller 100 keeps, during use, specific developments allowing, on the one hand, direct manual urging of its frame 110 by the rear part 112 of the latter, at the pushing member 150, and on the other hand, the indirect control of its rolling blocking system 160, by means of the control mechanism 270 able to be actuated by activating the actuating member 280. For its part, the accessory 200, which occupies the rear region of the double stroller 1, has singularities compared to an existing single stroller, namely that, on the one hand, behind its frame 210, its wheels 230G and 230D are not fixed but pivoting, and on the other hand, in front of its frame 210, no wheel or similar member for rolling on the ground is provided, in favor of the connection mechanism 250 and the control mechanism 270. This being the case, outside of these specificities, the accessory 200 has similarities, at least visible or even esthetic, with a single stroller, in particular regarding its frame 210, its receiving member 220 and its pushing member 240, which makes the grasping and use of the accessory 200 by the user intuitive. It will also be understood that when the stroller 100 and the accessory 200 are disconnected from one another, the stroller 100 remains usable independently of the accessory 200, as single stroller, while the accessory 200 is no longer, by itself, functionally usable to transport a child.

During use, that is to say, during the use of the double stroller 1, the safety and maneuverability of this double stroller 1 are remarkable, in particular when the double stroller 1 must be immobilized, as well as during a change in direction or when crossing an obstacle such as a sidewalk, as described in detail hereinafter.

Thus, when the double stroller 1 is in use and the user standing behind it wishes to immobilize it, the user activates the actuating member 280, for example by acting on the pedal 281 with the foot. This activation, for example the movement of the pedal 281, is transmitted by the mechanical transmission system 290, in particular by the cables 291, to the control mechanism 270, in particular to its coupling mechanism 272, which thus for example goes from its position of FIG. 6 to its position of FIG. 8. The coupling member 272 then activates the actuating part 161 in order to actuate the rolling blocking system 160. More generally, the control mechanism 270 then controls the rolling blocking system 160, such that the latter blocks the rolling of the rear wheels 140G and 140D of the stroller 100, and thereby blocks the rolling of the double stroller 1. By reversibility of the rolling blocking system 160 and the control mechanism 270, the user can next activate the actuating member 280 so as to free the rear wheels 140G and 140D, and thereby free the rolling of the double stroller 1. Thus, the immobilization and the release of the double stroller 1 are done by the user while the latter is standing behind the double stroller 1, which is intuitive and safe. Since it is the "intermediate" wheels of the double stroller 1 that are blocked by interference with the blocking system 160, namely the rear wheels 140G and 140D of the stroller 100, the rolling blocking of the double stroller 1 is particularly effective irrespective of the loading scenario of the double stroller, that is to say, irrespective of the actual presence and respective weight of the two children respectively installed in the accessory 200 and in the stroller 100, since the weight transported by the double stroller is always carried primarily by these "intermediate" wheels. Indeed, irrespective of the loading scenario, a substantial portion of the load resulting from the child transported in the stroller 100 is transmitted to the wheels 140G and 140D directly by the rear part 112 of the frame 110 and, at the same time, a substantial portion of the load resulting from the child transported in the accessory 200 is transmitted to this rear portion 112 of the frame 110 successively by the front part 211 of the frame 210 and the connection mechanism 250.

Figure 9:
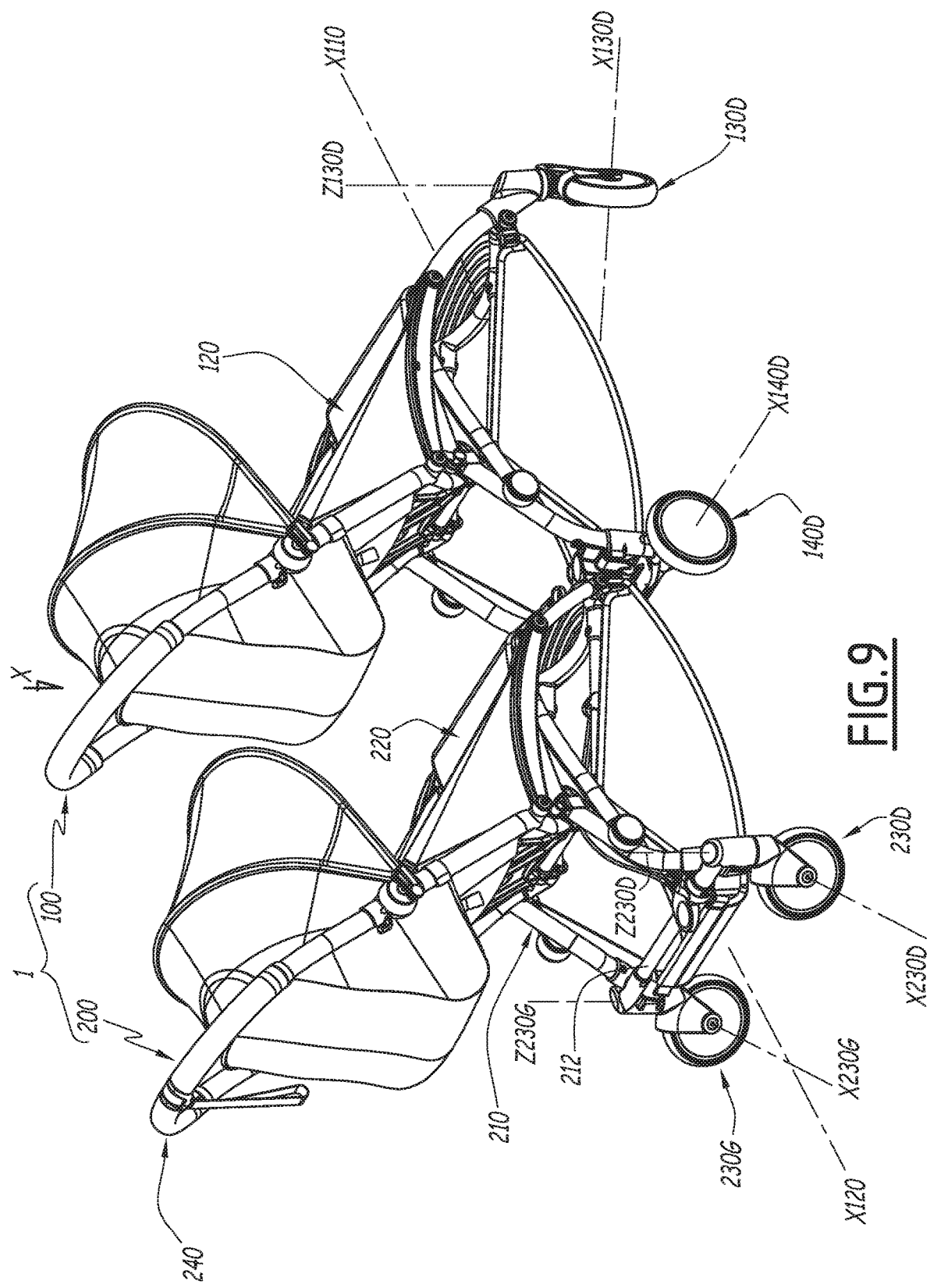
FIG. 9 is a perspective view, which is similar to FIG. 2 and which shows the illustration of the double stroller-forming assembly when the direction of advance of this double stroller-forming assembly is modified.
Figure 10:
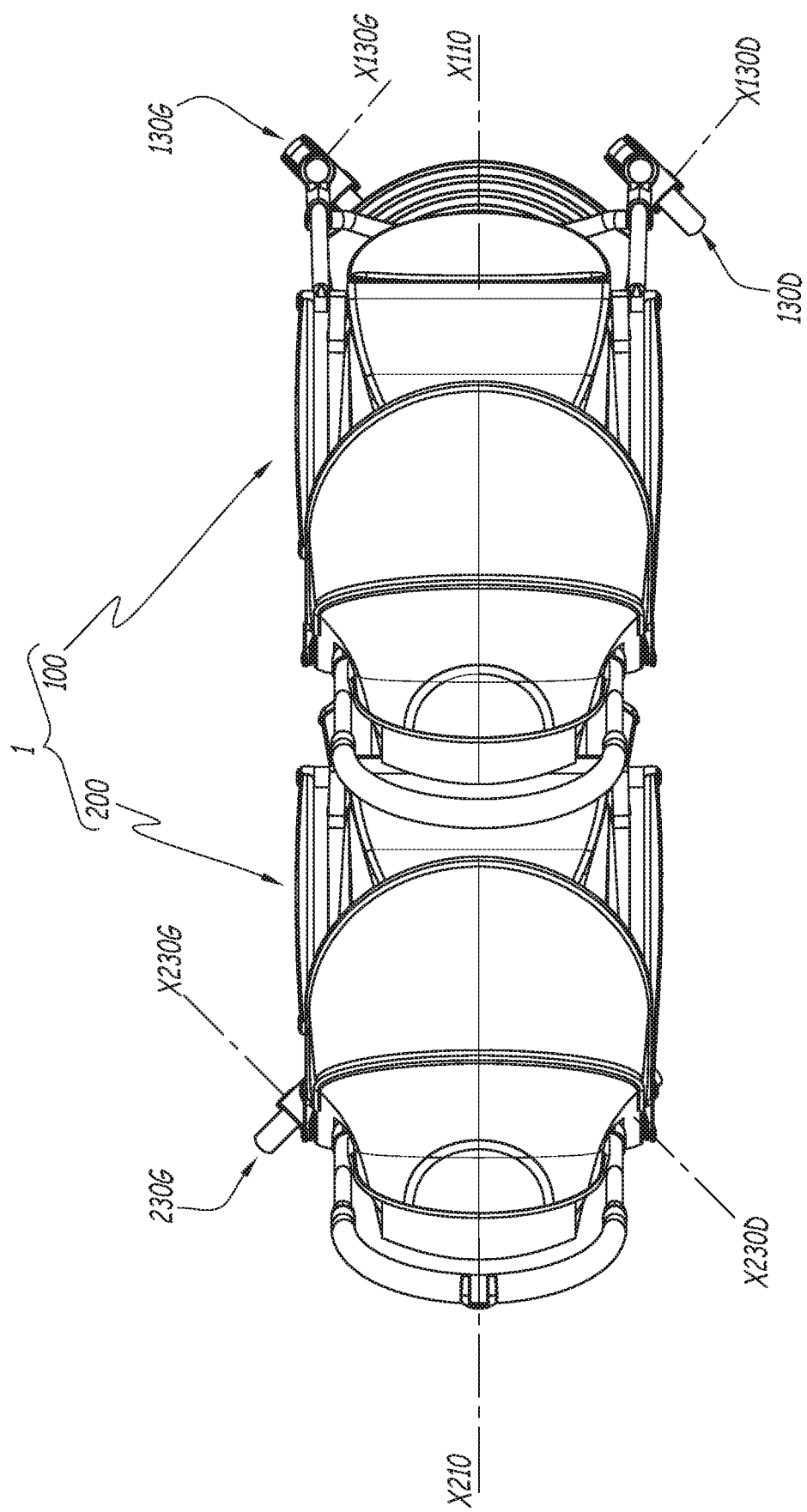
FIG. 10 is an elevation view along arrow X of FIG. 9.

Regarding the maneuverability of the double stroller 1 during a change in direction of advance, reference may usefully be made to FIGS. 9 and 10. Indeed, compared to FIGS. 1 and 2 in which the double stroller 1 progresses in a straight line in the forward direction when a user, standing behind the accessory 200, pushes the double stroller 1 in the forward direction while urging the pushing member 240 in a corresponding manner, FIGS. 9 and 10 show the behavior of the double stroller 1 when the same user, still standing behind the accessory 200, imparts a turn to the left on the double stroller 1 by manually urging the pushing member 240. As clearly shown in FIGS. 9 and 10, the impulse thus imparted by the user causes the front wheels 130G and 130D to turn to the left around their pivot axis Z130G and Z130D while, at the same time, the wheels 230G and 230D of the accessory 200 pivot to the right around their pivot axis Z230G and Z230D. The opposing orientations, respectively taken by the front wheels 130G and 130D and the wheels 230G and 230D, result from a differential effect, produced by the rear wheels 140G and 140D, which are fixed. In other words, with respect to the front wheels of the stroller 100 and the wheels of the accessory 200, the "intermediate" wheels of the double stroller 100, that is to say, the rear wheels 140G and 140D of the stroller 100, form, in a way, a fixed differential gearing with pivot effect in a horizontal plane, allowing the user to steer, during changes in direction, the double stroller 1 practically identically to the steering of a single stroller with pivoting front wheel(s) and fixed rear wheels. This differential effect at the aforementioned "intermediate" wheels, that is to say, the wheels 140G and 140D, is even more interesting in that these are "intermediate" wheels that bear the majority of the weight of the two children transported by the double stroller 1, as explained a little further above.

The maneuverability of the double stroller 1 during the change in direction is advantageously reinforced by providing that the path V230, between the wheels 230G and 230D of the accessory 200, is larger than the path V140 between the rear wheels 140G and 140D of the stroller 100. The swiveling of the wheels 230G and 230D of the accessory 200 is in particular made easier.

Regarding the maneuverability of the double stroller 1 when crossing an obstacle extending transversely to its front-back direction, such as a sidewalk, the connection mechanism 250 allows the double stroller 1 to behave longitudinally like a caterpillar. Indeed, if one looks in detail at the exemplary use of the double stroller 1 to move up onto a sidewalk, the user first proceeds by bringing the stroller 100 into the immediate vicinity of, or even abutting against the sidewalk, by naturally orienting the front-back axis X110 transversely, or even perpendicular to the sidewalk. Without letting go of the pushing member 240 with one of his hands, the user manually urges the pushing member 150 with his other hand, if necessary by placing himself alongside the accessory 200, indifferently on the left or the right thereof: manipulating the pushing member 150 so as to tilt the rear part 112 of the frame 110 slightly backward and downward, the front part 111 of this frame tilts, in a corresponding manner, backward and upward, which causes the front wheels 130G and 130D to come up off the ground, while at the same time, the back wheels 140G and 140D of the stroller 100 and the wheels 230G and 230D of the accessory 200 stay in contact with the ground, since the frame 110 can tilt freely relative to the frame 210 around the tilting axis Y250 in line with the connection mechanism 250. The user can then, with one and/or the other of his hands, move the double stroller 1 slightly forward, until the front wheels 130G and 130D are over the sidewalk. Still without letting go of the pushing member 240 with one of his hands, the user can release the pushing member 150, to place the front wheels 130G and 130D back in contact with the ground, at sidewalk height. The user, if applicable totally back behind the accessory 200, can next move the double stroller 1 forward, until the back wheels 140G and 140D of the stroller 100 reach the vicinity of, or abut against, the sidewalk: by acting this time on the pushing member 240, the user tilts the rear part 212 of the frame 210 downward and backward, until slightly raising the front part 211 of the frame 210. By transmission of movement through the connection mechanism 250, the rear part 112 of the frame 110 is lifted in a corresponding manner allowing the rear wheels 140G and 140D of the stroller 100 to cross the sidewalk. Lastly, after having again moved the double stroller 1 slightly forward until bringing the wheels 230G and 230D of the accessory 200 into the vicinity of the sidewalk, or even into contact with the latter, the user brings these wheels across it, if necessary by slightly lifting the pushing member 240, the frame 210 thus tilting freely around the tilting axis Y250 relative to the frame 110, which rests, by its wheels 130G, 130D, 140G and 140D, on the high level of the sidewalk.

More generally, it will be understood that the free tilting articulation between the frames 110 and 210 allows the double stroller 1 to roll comfortably on irregular ground, as well as to cross any transverse obstacle easily, both upward and downward, inasmuch as, depending on the height and the crossing direction of the obstacles, the user can act on one and/or the other of the pushing members 150 and 240, while always keeping one of his hands on the pushing member 240 to guarantee complete safety. At the same time, the free articulation between the frames 110 and 210 is, in a way, accommodated by the control mechanism 270, in particular by its support 271 connected in rotation to the rear part 112 of the frame 110 around the tilting axis Y250, the control mechanism 270 thus remaining operational irrespective of the actual tilted position between the frame 110 and the frame 210.

Figure 11:
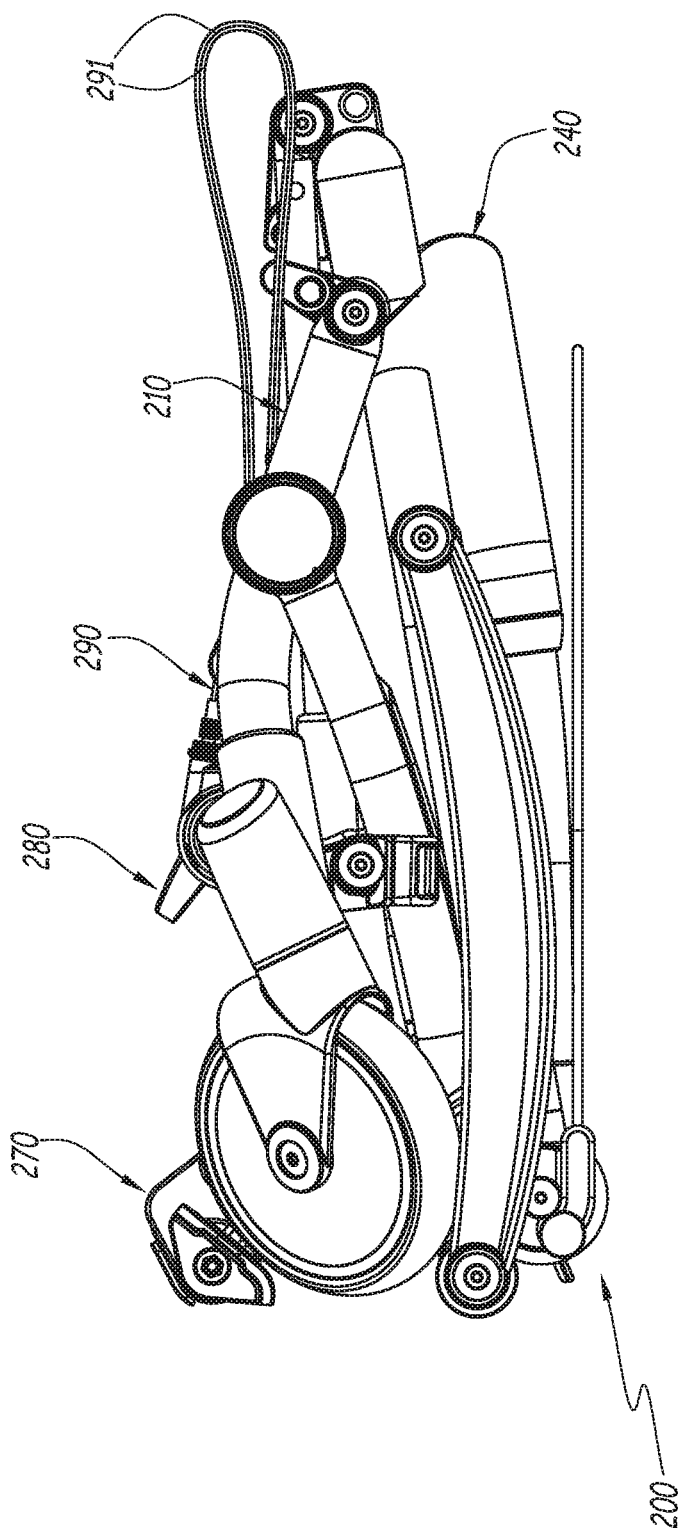
FIG. 11 is an elevation view of the accessory of FIG. 3, shown in a folded configuration.
Figure 13:
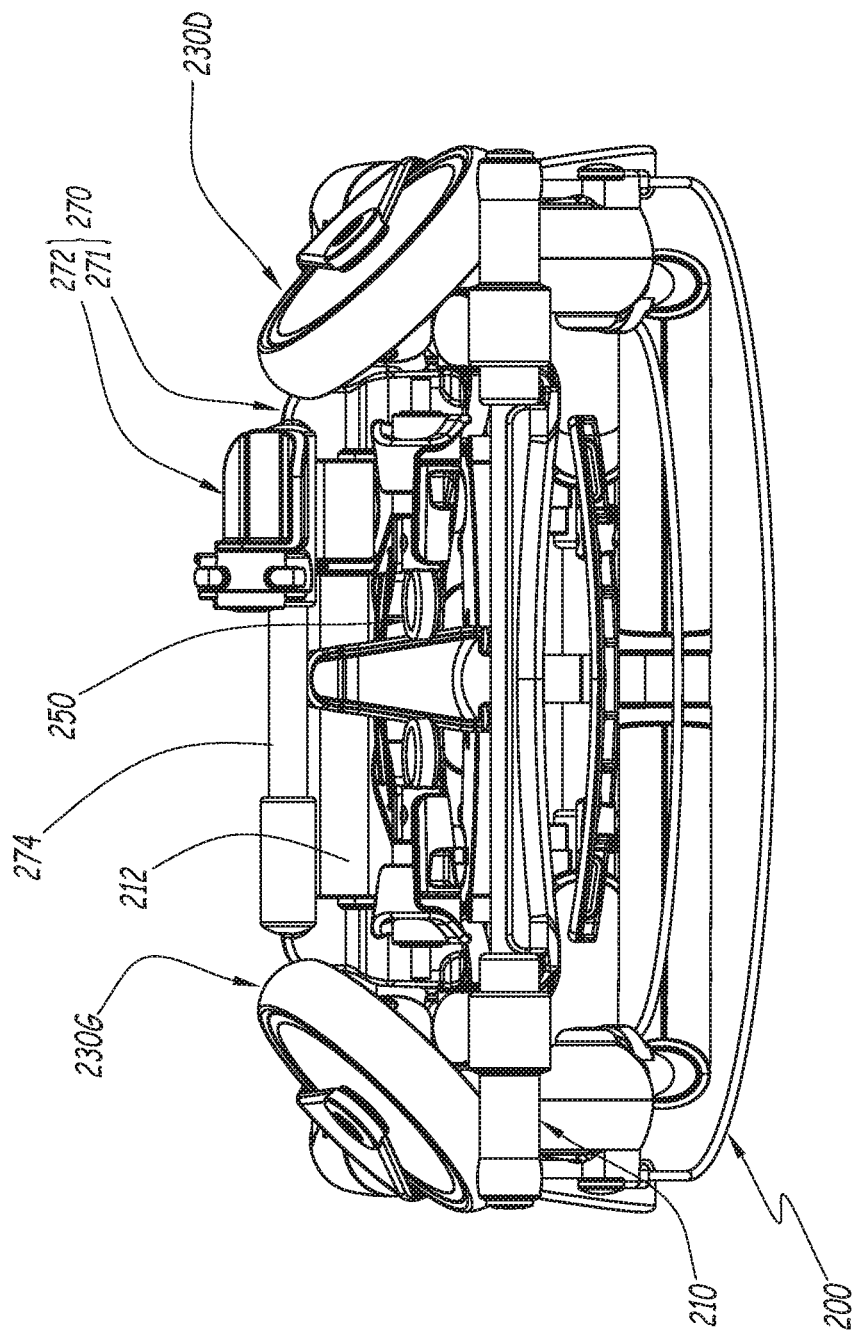
FIG. 13 is a view similar to FIGS. 11 and 12, in an observation direction that is different from that of FIGS. 11 and 12.

Lastly, FIGS. 11 to 13 show the accessory 200, disconnected from the stroller 100 and transitioned, by folding, into a storage configuration from its usage configuration illustrated in the preceding figures. Thus, according to this advantageous optional aspect, the frame 210 of the accessory 200 is, once it is disconnected from the frame 110 of the stroller 100, foldable between the usage configuration of FIGS. 1 to 10, in which the accessory 200 can be connected to the stroller 100 by the connection mechanism 250 as explained above, and the storage configuration of FIGS. 11 to 13, which is more compact than the usage configuration. Once the frame 210 is in this storage configuration, the accessory 200 is easily transportable by the user of the stroller 100: indeed, the accessory 200 folded on itself can be carried by hand or on the shoulder, using a strap, by the user of the stroller 100, walking behind the latter and pushing it. In a variant, the accessory 200 folded on itself can be attached directly to the stroller 100, using an ad hoc device.

According to one advantageous optional development, which is more specifically illustrated by FIGS. 14 to 18, the accessory 200 also includes a blocking mechanism 300 that makes it possible to block the wheels 230G and 230D of the accessory.

As illustrated by FIGS. 14 to 18, this blocking mechanism 300 is arranged in the rear part 212 of the frame 210, while being carried movably by this rear part 212 of the frame 210. The blocking mechanism 300 is designed so as to interfere reversibly with at least one of the wheels 230G and 230D, or even advantageously with both of these wheels 230G and 230D, so as to block the rolling of these wheels, that is to say, to block the rotation of the latter around their axis of rotation X230G, X230D, irrespective of the orientation of these wheels around their pivot axis Z230G, Z230D. To that end, the blocking mechanism 300 includes elements associated with each of the wheels 230G and 230D: hereinafter, one embodiment of only the developments associated with the right wheel 230D will be described in detail, with the understanding that these developments are transposable, symmetrically, to the left wheel 230G.

Thus, in the embodiment illustrated in FIGS. 14 to 18, the blocking mechanism 300 includes, for the right wheel 230D, a blocking element 301 that is provided to be movable relative to the frame 210 so as to be able to interfere, reversibly, with the wheel 230D so as to block the rolling thereof. More specifically, the blocking element 301D is both centered on the pivot axis Z230D and movable along this pivot axis Z230D. To that end, according to one practical embodiment, the blocking element 301D has an elongated shape along the pivot axis Z230D, for example forming a rod or a similar elongated part. In all cases, the blocking element 301D includes two ends opposite one another along the pivot axis Z230D, namely one end 302D, facing the wheel 230D, and one end 303D.

Figure 14:
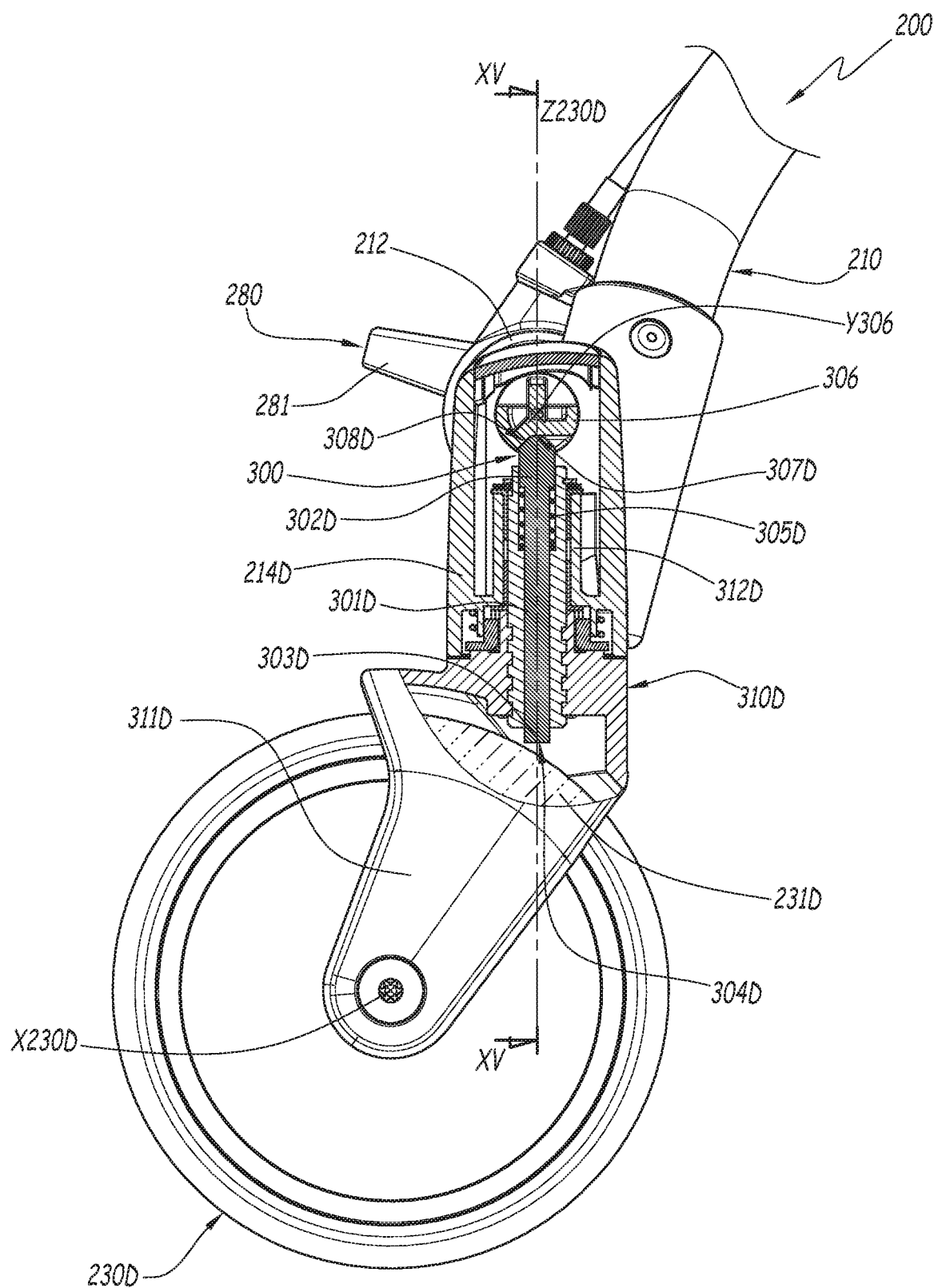
FIG. 14 is a partial sectional view along plane XIV in FIG. 1.
Figure 15:
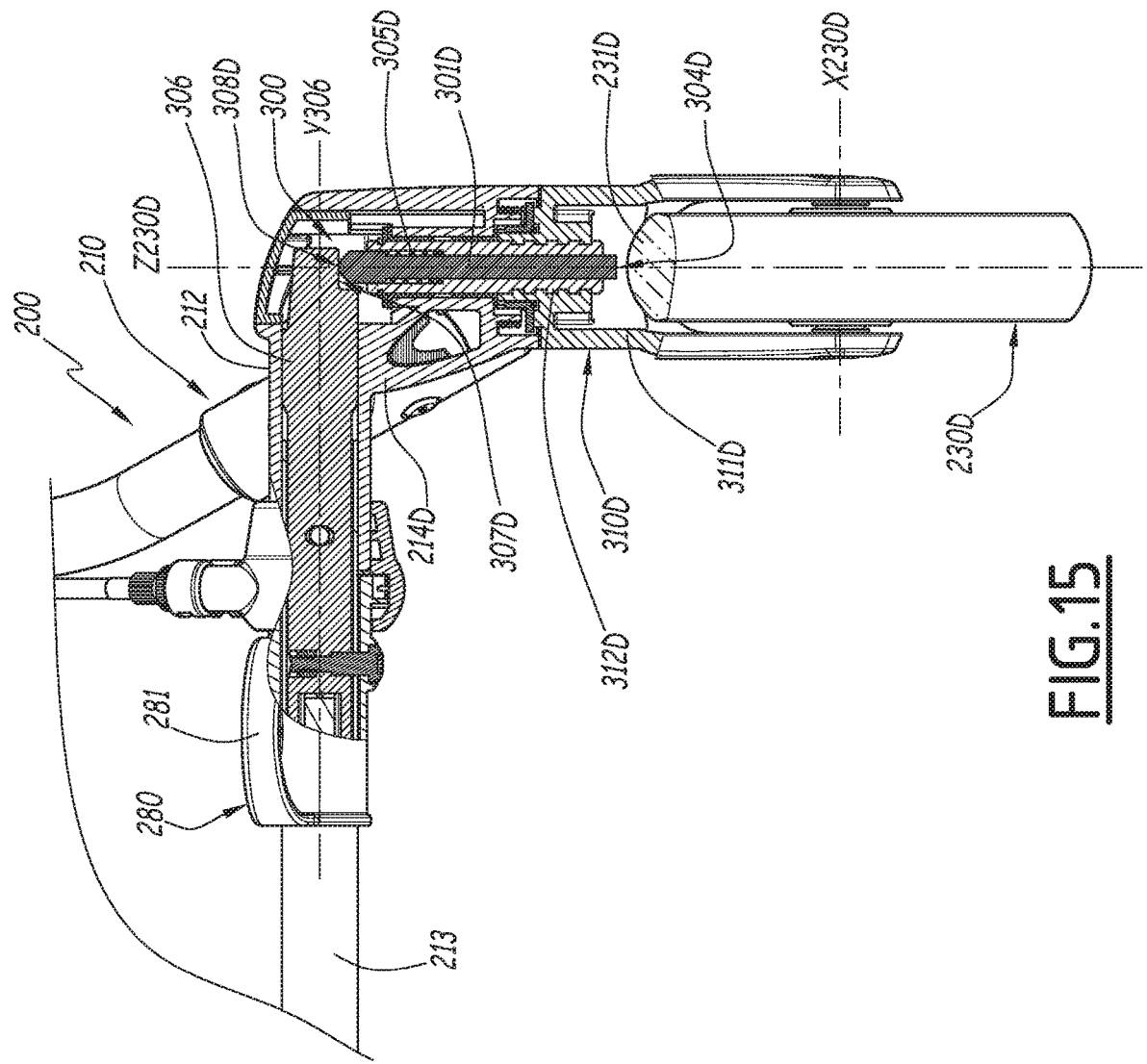
FIG. 15 is a partial sectional view along line XV-XV in FIG. 14.
Figure 16:
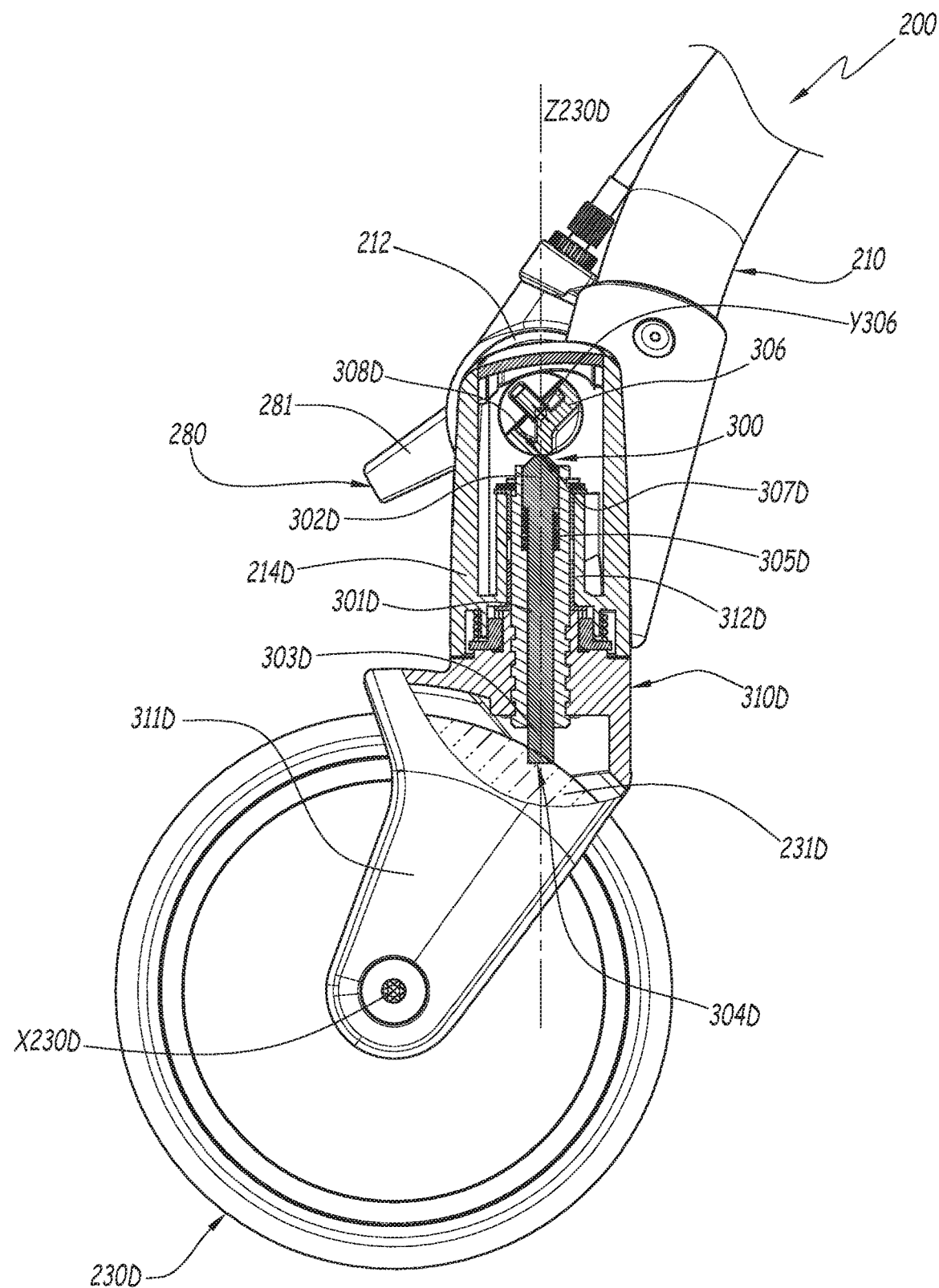
FIG. 16 is a view similar to FIG. 14, illustrating the actuation of a blocking mechanism of the accessory.
Figure 17:
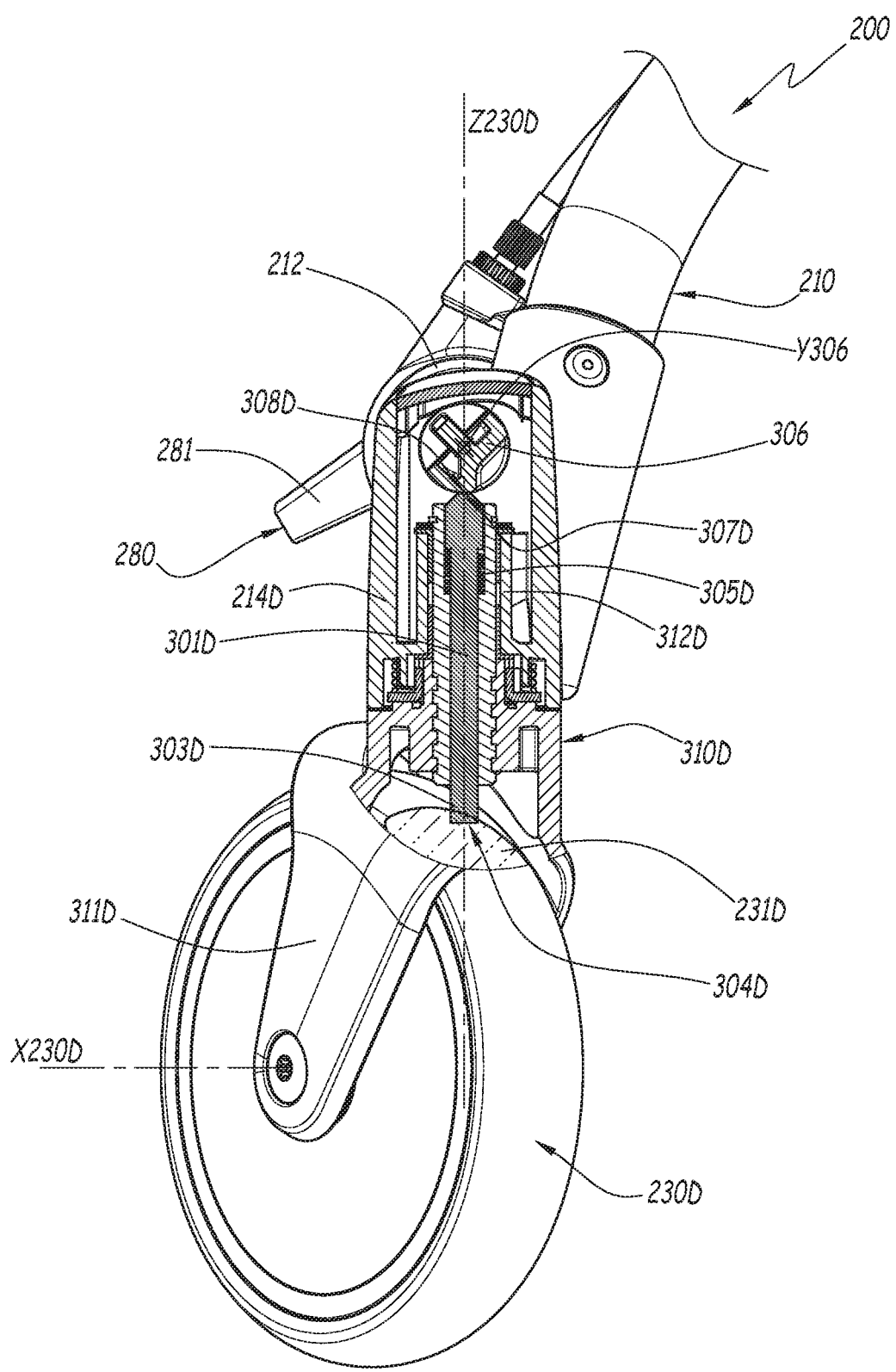
FIG. 17 is a view similar to FIG. 16.
Figure 18:
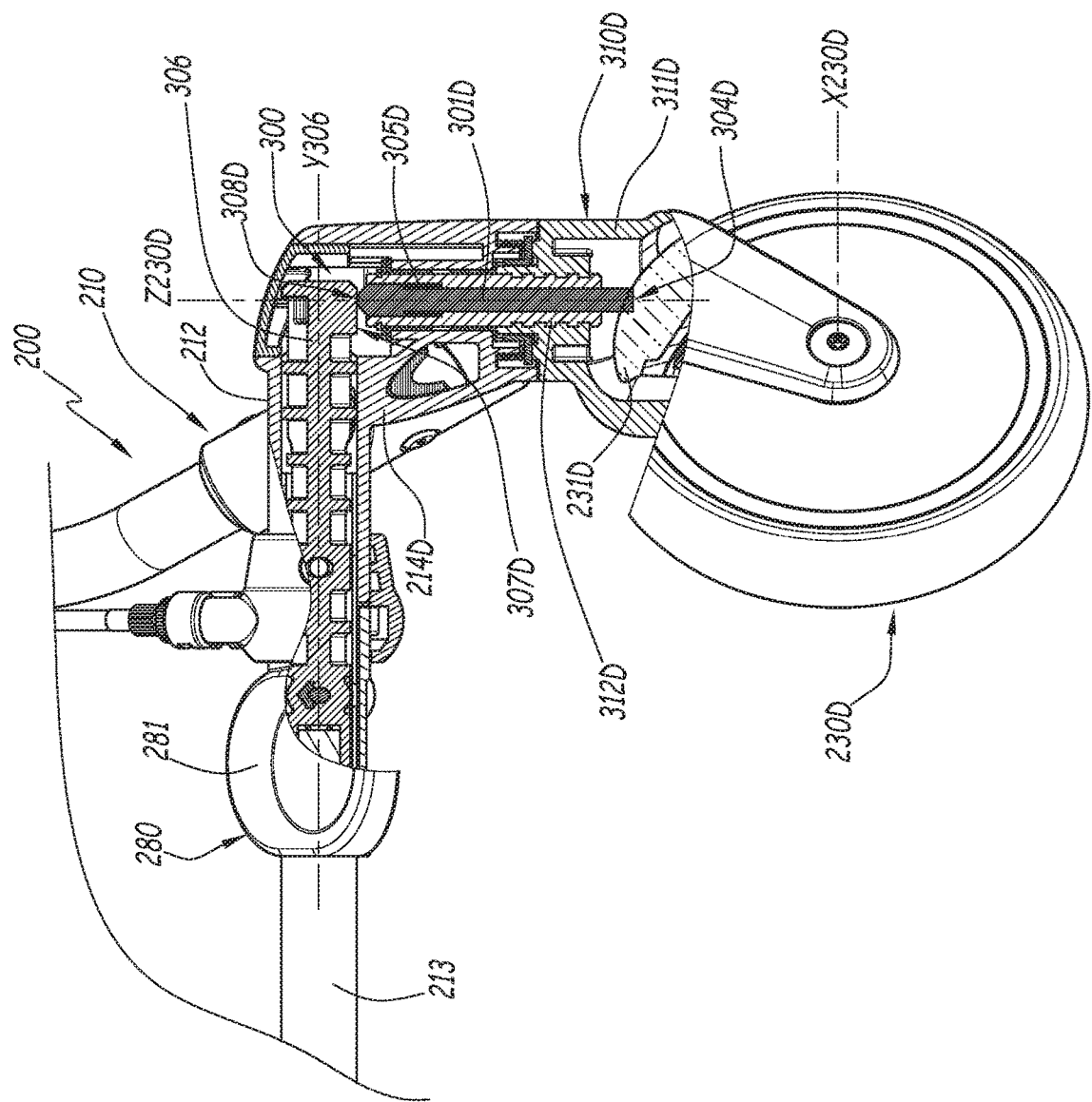
FIG. 18 is a view similar to FIG. 15, illustrating the accessory in its state of FIG. 17.

The movement of the blocking element 301D along the pivot axis Z230D is provided between a disengaged position, illustrated in FIGS. 14 and 15, and an engaged position, illustrated in FIGS. 16 to 18. In the disengaged position, the blocking element 301D is separated from the wheel 230D so as to leave this wheel free to roll. In the engaged position, the blocking element 301D, more specifically its end 302D, interferes with a tread 231D of the wheel 230D so as to block the rolling of this wheel 230D. In practice, the tread 231D of the wheel 230D has a certain flexibility, in particular compared to the hub of this wheel, allowing the end 302D of the blocking element 301D to crush the tread 231D locally by sinking into the latter, subject to the flexible deformation of this tread. The specificities relative to the respective materials of the blocking element 301D and the tread 231D are not limiting with respect to the invention, as long as their interference, when the blocking element 301D is in the engaged position, ensures effective rolling blocking of the tire 230D. According to one embodiment that reinforces the blocking effects of this interference, the end 302D of the blocking element 301D is provided with a bearing surface 304D that, when the blocking element 301D is in the engaged position, is pressed along the pivot axis Z230D against the tread 231D, sinking therein locally, as shown in FIGS. 16 to 18.

In all cases, because the movement of the blocking element 301D is centered on the pivot axis Z230D, the rolling blocking of the wheel 230D by the blocking element 301D in the engaged position is effective irrespective of the angular position of the wheel 230D around its pivot axis Z230D, as clearly shown by comparing FIGS. 16 and 17. In other words, irrespective of the orientation of the wheel 230D around the pivot axis Z230D, the blocking element 301D in the engaged position blocks this wheel 230D in rotation around its axis of rotation X230D, by local interference with the tread 231D of this wheel.

The developments of the accessory 200 allowing the blocking element 301D to be both movable and centered on the pivot axis Z230D are not limiting with respect to the invention. According to one practical and reliable embodiment, which is implemented in the embodiment considered in the figures, these developments involve a holder 310D associated with the wheel 230D. This holder 310D movably couples the wheel 230D to the frame 210, more specifically to a left portion of the rear part 212 of this frame, in particular to an assembly casing 214D that ensures a fixed assembly of the right end of the crosspiece 213 with the rest of the rear part 212 of the frame 210. In the exemplary embodiment considered here, and as clearly shown in FIGS. 14 to 18, the holder 310D includes a fork 311D, at the base of which the wheel 230D is mounted rotating around the axis of rotation X230D, an upper portion of this wheel 230D being arranged between the branches of the fork 311D. The holder 310D also includes a tubular insert 312D, which is secured to the fork 311D, while extending upward from the apex of the latter, and which is substantially centered on the pivot axis Z230D. This tubular insert 312D is mounted freely pivoting around the pivot axis Z230D on the right portion of the rear part 212 of the frame 210, more specifically inside the assembly casing 214D, one or several bearings being inserted, radially with respect to the pivot axis Z230D, between the tubular insert 312D and the assembly casing 214D. Additionally, the tubular insert 312D is mounted fixed in translation along the pivot axis Z230D relative to the frame 210, in particular inside the assembly casing 214D, for example using a circlip interposed between them. More generally, the structure of the holder 310D, described in detail above, is not limiting as long as the holder 310D is mounted on the rear part 212 of the frame 210 pivoting around the pivot axis Z230D and the wheel 230D is mounted rotating around its axis of rotation X230D on this holder 310D. Additionally, it is recalled that what has just been described for the right wheel 230D is transposable to the left wheel 330G: the left wheel 230G can thus be associated with a holder 310G, in particular visible in FIG. 2, similar to the holder 310D. In all cases, as clearly shown in FIGS. 14 to 18, the blocking element 301D is advantageously guided in translation along the axis Z230D by the holder 310D. To that end, in the exemplary embodiment considered here, the blocking element 301D is received in a fitted manner and freely sliding inside the tubular insert 312D of the holder 310D.

In order to control the movement of the blocking element 301D between the disengaged and engaged positions, the blocking mechanism 300 includes a spring 305D and an actuator 306.

The spring 305D acts on the blocking element 301D by pushing the latter back toward the disengaged position. In the exemplary embodiment considered in the figures, the spring 305D is interposed, along the direction of the pivot axis Z230D, between the blocking element 301D and the holder 310D, while being both arranged around the blocking element 301D and housed inside the tubular insert 312D.

The actuator 306 is in turn mounted movably on the frame 210 so as to be able to drive the blocking element 301D from the disengaged position to the engaged position, while thwarting the action of the spring 305D. In the exemplary embodiment considered in the figures, the actuator 306 is comparable to a rotary shaft, while having an elongated shape, centered on the actuating axis Y306, which extends substantially perpendicular to the pivot axes Z230G and Z230D and around which the actuator 306 is rotatable. At its end turned toward the pivot axis Z230D, the actuator 306 is provided with a ramp surface 307D designed to cooperate by contact with the blocking element 301D, more specifically with the end 303D of the latter: as clearly shown in FIGS. 14 to 18, the end 303D of the blocking element 301D is provided with a bearing surface 308D that, under the action of the spring 305D, is pressed along the pivot axis Z230D against the ramp surface 307D of the actuator 306. The profile of the ramp surface 307D is designed to push the blocking element 301D along the pivot axis Z230D toward the wheel 230D when the actuator 306 is rotated around the actuating axis Y306 from a first angular position, which is shown in FIG. 14 and which is associated with the disengaged position, to a second position, which is shown in FIGS. 16 to 18 and which is associated with the engaged position. Of course, it will be understood that the specificities, in particular the profile, of a dedicated surface of the actuator 306, such as the ramp surface 307D, that cooperates by contact with the blocking element 301D for the purposes of its driving from the disengaged position to the engaged position, are not limiting with respect to the invention, but on the contrary, are directly dependent on the mobility characteristics of the actuator 306 relative to the frame 210.

In all cases, the actuator 306 is advantageously provided to drive the blocking element 301D associated with the right wheel 230D jointly with the blocking element associated with the left wheel 230G, while thwarting the action of the springs respectively associated with these two blocking elements in order to transition the latter from their disengaged position to their engaged position. Thus, in the exemplary embodiment considered in the figures, the actuator 306 extends from the blocking element 301D to the blocking element associated with the left wheel 230G.

Irrespective of the embodiment of the actuator 306, the latter is connected in movement to the actuating member 280 of the accessory 200 such that, during the activation of the actuating member 280 in order to actuate the control mechanism 270 as explained above, the actuating member 280 jointly actuates the blocking mechanism 300, while moving the actuator 306 so that it drives the blocking element(s) from their disengaged position to their engaged position. More generally, the accessory 200 is designed such that the actuating member 280 is coupled to the blocking mechanism 300 so as to actuate this blocking mechanism jointly with the actuation of the control mechanism 270: it will be understood that the activation of the actuating member 280 by a user standing behind the double stroller 1 simultaneously actuates, on the one hand, the rolling blocking system 160 of the stroller 1, via the mechanical transmission system 290 and the control mechanism 270, and, on the other hand, the blocking mechanism 300, via the connection between the actuating member 280 and the actuator 306. In practice, the nature of the connection between the actuating member 280 and the actuator 306 depends on the specificities of the latter. In the exemplary embodiment considered in the figures, the pedal 281 of the actuating member 280, described above, is advantageously fixedly secured to the actuator 306, in particular to a running part of this actuator as clearly shown in FIGS. 15 to 18, by providing both that the actuator 306 is mounted and guided in rotation around the actuating axis Y306 inside the crosspiece 213 of the rear part 212 of the frame 10 and that the pedal 281 is mounted tilting around this actuating axis Y306 on the crosspiece 213.

Thus, when the double stroller 1 is in use and the user standing behind it wishes to immobilize it, the user activates the actuating member 280, for example by acting on the pedal 281 with the foot. This activation leads jointly, on the one hand, to the rolling blocking of the rear wheels 140G and 140D of the stroller 100 by the rolling blocking system 160 controlled by the control mechanism 270, and on the other hand, the blocking of the wheels 230G and 230D of the accessory 200 by the blocking mechanism 300. By reversibility, on the one hand, of the rolling blocking system 160 and the control mechanism 270, and, on the other hand, of the blocking mechanism 300, the user can next activate the actuating member 280 so as to jointly free the rear wheels 140G and 140D of the stroller 1 and the wheels 230G and 230D of the accessory 200, and thereby free the rolling of the double stroller 1. The rolling blocking of the double stroller 1, essentially ensured by the blocking of the wheels 140G and 140D as explained above, is thus advantageously reinforced subject to the blocking of the wheels 230G and 230D, which thus improves the immobilization of the double stroller 1, in particular when the latter is in exceptional usage situations, such as very steep or uneven slopes.

Moreover, various arrangements and variants to the stroller 100 and the accessory 200 described thus far may be considered:
- rather than having two front wheels, the stroller 100 can have only one front wheel, arranged on the front-back axis X110; likewise, more than two front wheels can be provided for the stroller 100, likewise more than two rear wheels can be provided for the stroller 100 and more than two wheels can be provided for the accessory 200; and/or
- each of the wheels mentioned thus far can be replaced by a pair of twinned wheels or twinned casters, or a train of more twinned wheels.

The invention claimed is:

1. A stroller accessory, which is connectable to a stroller so as together to form a double stroller and which is unusable to transport a child when the stroller accessory is disconnected from the stroller,
wherein the stroller accessory includes:
a frame that, during use, bears a receiving member in which a child to be transported can be installed,
a connection mechanism for reversibly connecting the stroller accessory to the stroller in order to form the double stroller, the connection mechanism being borne by a front part of the frame of the stroller accessory and being suitable for securing the front part of the frame of the stroller accessory removably to a rear part of a frame of the stroller so as both to arrange the stroller accessory behind the stroller in a front-back direction and to define a tilting axis, which extends during use substantially parallel to the ground and substantially perpendicular to the front-back direction and around which the front part of the frame of the stroller accessory and the rear part of the frame of the stroller tilt freely relative to one another,
two wheels, which, when the stroller accessory is connected to the stroller by the connection mechanism, bear and roll on the ground and which are coupled to a rear part of the frame of the stroller accessory so as to pivot around respective pivot axes,
a pushing member, which is borne by the rear part of the frame of the stroller accessory and which is suitable for being urged manually by a user standing behind the double stroller,
a control mechanism for controlling a rolling blocking of the double stroller, the control mechanism being borne by the front part of the frame of the stroller accessory and being suitable, when the stroller accessory is connected to the stroller by the connection mechanism, for cooperating mechanically with a rolling blocking system, integrated into the stroller, so as to control the rolling blocking system, and
an actuating member, which is borne by the rear part of the frame of the stroller accessory so as to be able to be activated by a user standing behind the double stroller, and which is coupled to the control mechanism so as to actuate the control mechanism.

2. The stroller accessory according to claim 1, wherein the stroller accessory further includes a blocking mechanism for blocking the wheels of the stroller accessory, the blocking mechanism being borne by the rear part of the frame of the stroller accessory and being suitable for interfering reversibly with at least one or with each of the two wheels of the stroller accessory so as to block the rolling thereof irrespective of the orientation of the wheel of the stroller accessory around the pivot axis of the wheel of the stroller accessory, and wherein the actuating member is coupled to the blocking mechanism so as to actuate the blocking mechanism jointly with actuation of the control mechanism.

3. The stroller accessory according to claim 2, wherein the blocking mechanism includes, for at least one of the two wheels of the stroller accessory or for each of the two wheels of the stroller accessory, a blocking element, which is substantially centered on the pivot axis of the wheel of the stroller accessory and which is movable along the pivot axis of the wheel of the stroller accessory relative to the frame of the stroller accessory between:
- a disengaged position, in which the blocking element is separated from the wheel of the stroller accessory so as to leave the wheel of the stroller accessory free to roll, and
- an engaged position, in which the blocking element interferes with a tread of the wheel of the stroller accessory so as to block the rolling of the wheel of the stroller accessory.

4. The stroller accessory according to claim 3, wherein each of the two wheels of the stroller accessory is associated with a holder:
- which is mounted on the rear part of the frame so as to pivot around the pivot axis of the wheel of the stroller accessory,
- on which the wheel of the stroller accessory is mounted rotating around itself to roll, and
- which guides the corresponding blocking element in translation along the pivot axis of the wheel of the stroller accessory.

5. The stroller accessory according to claim 3, wherein the blocking mechanism further includes:
- for the or each blocking element, a spring that pushes the blocking element back toward the disengaged position, and
- an actuator, which is connected in movement to the actuating member and which, during joint actuation of the blocking mechanism and the control mechanism by the actuating member, drives the blocking element(s) from the disengaged position to the engaged position, while thwarting the action of the spring(s).

6. The stroller accessory according to claim 5, wherein the or each blocking element includes a first end and a second end, which are opposite one another along the pivot axis of the corresponding wheel of the stroller accessory,
- wherein the first end of the or each blocking element is provided with a first bearing surface that, when the blocking element is in the engaged position, is pressed along the pivot axis of the corresponding wheel of the stroller accessory against the tread of the corresponding wheel of the stroller accessory,
- and wherein the second end of the or each blocking element is provided with a second bearing surface that, under the action of the corresponding spring, is pressed along the pivot axis of the corresponding wheel of the stroller accessory against a dedicated surface of the actuator.

7. The stroller accessory according to claim 5, wherein the actuator is rotatable, relative to the frame of the stroller accessory, around an actuating axis that extends substantially perpendicular to the respective pivot axes of the wheels of the stroller accessory.

8. The stroller accessory according to claim 7, wherein the rear part of the frame of the stroller accessory comprises a crosspiece:
- which extends between the two wheels of the stroller accessory,
- inside which the actuator is mounted and guided in rotation around the actuating axis, and
- on which a pedal of the actuating member is mounted tilting around the actuating axis, while being secured to the actuator.

9. The stroller accessory according to claim 1, wherein the control mechanism includes a holder that is:
- coupled to the front part of the frame of the stroller accessory so as to freely tilt around the tilting axis, and
- configured so as, when the stroller accessory is connected to the stroller by the connection mechanism, to partially surround the rear part of the frame of the stroller so as to be connected in rotation to the rear part of the frame of the stroller around the tilting axis, and wherein the control mechanism also includes a coupling member that is:
- borne movably by the holder of the control mechanism,
- coupled to the actuating member such that the actuating member drives the movement of the coupling member, and
- suitable, when the stroller accessory is connected to the stroller by the connection mechanism, for engaging the rolling blocking system of the stroller.

10. The stroller accessory according to claim 9, wherein the coupling member is suitable, when the stroller accessory is connected to the stroller by the connection mechanism, for connecting itself in movement to an actuating part, said actuating part belonging to the rolling blocking system of the stroller and being provided, when the stroller accessory is disconnected from the stroller, for being activated directly by a user standing behind the stroller.

11. The stroller accessory according to claim 10, wherein the coupling member includes a yoke that is suitable for connecting itself in movement to a pedal of the actuating part, while capping the pedal.

12. The stroller accessory according to claim 9, wherein the holder of the control mechanism includes a left branch and a right branch, as well as a bar that fixedly couples the left and right branches to one another, and wherein the left and right branches are coupled in rotation to the rear part of the frame of the stroller around the tilting axis when the stroller accessory is connected to the stroller by the connection mechanism, while being configured so as to partially surround left and right uprights, respectively, of the rear part of the frame of the stroller.

13. The stroller accessory according to claim 9, wherein the connection mechanism includes a bearing part:
- which supports and guides the movement of the rest of the connection mechanism,
- on which the holder of the control mechanism is mounted so as to tilt around the tilting axis, and
- which is integrated into a footrest borne by the front part of the frame of the stroller accessory.

14. The stroller accessory according to claim 9, wherein the stroller accessory further includes a mechanical transmission system, which is borne by the frame of the stroller accessory, while extending between the front and rear parts of the frame of the stroller accessory, and which mechanically couples the actuating member and the control mechanism such that the actuating member actuates the control mechanism, and wherein the mechanical transmission system includes cables that couple the actuating member and the coupling member to one another such that the actuating member drives the movement of the coupling member.

15. The stroller accessory according to claim 1, wherein the stroller accessory further includes a mechanical transmission system, which is borne by the frame of the stroller accessory, while extending between the front and rear parts of the frame of the stroller accessory, and which mechanically couples the actuating member and the control mechanism such that the actuating member actuates the control mechanism.

16. The stroller accessory according to claim 1, wherein the frame of the stroller accessory is suitable, when the stroller accessory is disconnected from the stroller, for being folded between a usage configuration, in which the stroller accessory can be connected to the stroller by the connection mechanism, and a storage configuration, which is more compact than the usage configuration.

17. An assembly forming a double stroller, including a stroller and a stroller accessory according to claim 1, wherein the stroller comprises:
 a frame, a rear part of which is connected to the front part of the frame of the stroller accessory by the connection mechanism and which, during use, supports a receiving member in which a child can be installed other than the child who can be installed in the receiving member of the stroller accessory,
 at least one front wheel that, during use, bears and rolls on the ground and that is coupled to a front part of the frame of the stroller in a pivoting manner,
 two rear wheels that, during use, bear and roll on the ground and that are coupled to the rear part of the frame of the stroller fixedly,
 a pushing member that is borne by the rear part of the frame of the stroller, and
 a rolling blocking system which is at least partly borne by the rear part of the frame of the stroller and which is suitable for interfering reversibly with the rear wheels of the stroller so as to block the rolling thereof.

18. The assembly forming a double stroller according to claim 17, wherein the two wheels of the stroller accessory are separated, perpendicular to the front-back direction, by a path that is larger than a path separating, perpendicular to the front-back direction, the two rear wheels of the stroller.

* * * * *